(12) United States Patent
Li et al.

(10) Patent No.: US 12,030,151 B2
(45) Date of Patent: Jul. 9, 2024

(54) IN-PLACE NON-CONTACT DETECTION METHOD FOR SHAFT WORKPIECE

(71) Applicant: JIANGSU UNIVERSITY OF SCIENCE AND TECHNOLOGY, Jiangsu (CN)

(72) Inventors: Guochao Li, Jiangsu (CN); Honggen Zhou, Jiangsu (CN); Yunlong Liu, Jiangsu (CN); Xiaoyan Guan, Jiangsu (CN); Xiaona Shi, Jiangsu (CN); Li Sun, Jiangsu (CN); Jianzhi Chen, Jiangsu (CN); Hengheng Wu, Jiangsu (CN); Qiang He, Jiangsu (CN); Feng Feng, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 379 days.

(21) Appl. No.: 17/618,500

(22) PCT Filed: Jun. 24, 2021

(86) PCT No.: PCT/CN2021/102006
§ 371 (c)(1),
(2) Date: Dec. 13, 2021

(87) PCT Pub. No.: WO2022/041986
PCT Pub. Date: Mar. 3, 2022

(65) Prior Publication Data
US 2022/0379423 A1    Dec. 1, 2022

(30) Foreign Application Priority Data
Aug. 27, 2020   (CN) .......................... 202010875603.1

(51) Int. Cl.
B23Q 17/20    (2006.01)

(52) U.S. Cl.
CPC .................................. *B23Q 17/20* (2013.01)

(58) Field of Classification Search
CPC ...................................................... B23Q 17/20
See application file for complete search history.

(56) References Cited

U.S. PATENT DOCUMENTS 4,864,148 A * 9/1989 Lysen .................. G01B 11/272
356/152.3
2016/0003608 A1    1/2016 Lenz

FOREIGN PATENT DOCUMENTS

CN    104990487         10/2015
CN    107101582 A  *   8/2017
(Continued)

OTHER PUBLICATIONS

"International Search Report (Form PCT/ISA/210)" of PCT/CN2021/102006, mailed on Sep. 27, 2021, pp. 1-4.
(Continued)

*Primary Examiner* — Mohamed Charioui
*Assistant Examiner* — Xiuqin Sun
(74) *Attorney, Agent, or Firm* — JCIP GLOBAL INC.

(57) ABSTRACT

The present invention discloses an in-place non-contact detection method for a shaft workpiece. The method includes: establishing a detection system, calibrating the detection system and establishing a detection coordinate system; analyzing a pose of a workpiece in the detection system to establish a coordinate system of a workpiece clamping device; controlling the workpiece clamping device of a shaft workpiece processing machine tool to rotate, continuously acquiring data by a linear laser measuring instrument, and calculating and analyzing the acquired data to obtain an ideal reference axis of the shaft workpiece; continuously acquiring data of a detection part, and calculating and analyzing the acquired data to obtain actual machining precision of runout of a shaft neck of a camshaft;

(Continued)

and continuously acquiring data of the detection part, and calculating and analyzing the acquired data to obtain machining precision of coaxiality of the shaft workpiece.

6 Claims, 5 Drawing Sheets

(56) References Cited

FOREIGN PATENT DOCUMENTS

| CN | 108827192 | 11/2018 |
| CN | 111238413 | 6/2020 |
| CN | 111993159 | 11/2020 |
| ES | 2415776 A2 * | 7/2013 |

OTHER PUBLICATIONS

"Written Opinion of the International Searching Authority (Form PCT/ISA/237)" of PCT/ CN2021/102006, mailed on Sep. 27, 2021, pp. 1-5.

* cited by examiner

IN-PLACE NON-CONTACT DETECTION METHOD FOR SHAFT WORKPIECE

CROSS-REFERENCE TO RELATED APPLICATION

This application is a 371 of international application of PCT application serial no. PCT/CN2021/102006, filed on Jun. 24, 2021, which claims the priority benefit of China application no. 202010875603.1, filed on Aug. 27, 2020. The entirety of each of the above mentioned patent applications is hereby incorporated by reference herein and made a part of this specification.

TECHNICAL FIELD

The present invention relates to a detection method for shaft workpieces in the field of processing, and in particular to an in-place non-contact detection method for a shaft workpiece.

BACKGROUND

The camshaft is a component of a piston engine and is used for controlling the opening and closing of the valve, the main body of the camshaft is a cylindrical rod body with approximately the same length as a cylinder set, a plurality of shaft necks are arranged on the camshaft, and a plurality of cams are sleeved in the shaft necks and used for driving the valve. The camshaft is a core component of an engine, with its machining precision directly influencing the overall performance indexes of the engine, such as noise, dynamic performance and economy. The machining precision for runout of a shaft neck of the camshaft is very demanding and is also a necessary item for detection; the traditional optical mechanical measuring instrument, the contact measuring head measuring instrument and the sample plate are extremely low in measuring efficiency and mostly need to be carried out off-line, so that the requirement of the current high-precision high-efficiency large-scale production mode cannot be met.

Therefore, it is desirable to solve the above problems.

SUMMARY

Objective: The present invention provides an in-place non-contact detection method for a shaft workpiece, which is small in error and high in detection effect.

The present invention discloses an in-place non-contact detection method for a shaft workpiece, which comprises:
(1) establishing a detection system, calibrating the detection system and establishing a detection coordinate system;
(2) analyzing a pose of a workpiece in the detection system to establish a coordinate system of a workpiece clamping device;
(3) controlling the workpiece clamping device of a shaft workpiece processing machine tool to rotate, continuously acquiring data by a linear laser measuring instrument, and calculating and analyzing the acquired data to obtain an ideal reference axis of the shaft workpiece;
(4) continuously acquiring data of a detection part by a laser displacement sensor, and calculating and analyzing the acquired data to obtain actual machining precision of runout of a shaft neck of a camshaft; and
(5) continuously acquiring data of the detection part by adopting the linear laser measuring instrument, and calculating and analyzing the acquired data to obtain machining precision of coaxiality of the shaft workpiece.

In the method, specific operations of the step (1) comprise that: the detection system comprises a grating guide rail positioned on one side of the machine tool, and a measurement position A, a measurement position C and a measurement position B positioned on the grating guide rail at intervals in sequence, wherein the measurement position A is measured by the linear laser measuring instrument, the measurement position C is measured by the laser displacement sensor, and the measurement position B is measured by the linear laser measuring instrument; the measurement position A and the measurement position B are reference positions required to be detected, and the measurement position C is a position required to be subjected to detection of runout, coaxiality and profile degree; the measuring directions of the linear laser measuring instrument and the laser displacement sensor are consistent, a calibration plate is placed at a distance L in front of the measuring directions, and a calibration plane of the calibration plate is adjusted to be orthogonal to a light path of the linear laser measuring instrument and to be perpendicular to a light path of the laser displacement sensor; wherein an XOY plane of the linear laser measuring instrument is parallel to the calibration plane of the calibration plate, the light path of the laser displacement sensor is perpendicular to the XOY plane, and the mounting direction of the laser displacement sensor on the grating guide rail is parallel to the Y axis; a coordinate system $O_A$—$X_A Y_A Z_A$ and a coordinate system $O_B$—$X_B Y_B Z_B$ of the linear laser measuring instrument at the position A and the position B are established; then the coordinate systems are adjusted to enable light spots of the laser displacement sensor to be on the Y axis of the light path of the linear laser measuring instrument, and a coordinate system $O_C$—$X_C Y_C Z_C$ of the laser displacement sensor at the position C is established; if measurement origins of the linear laser measuring instrument are denoted as zero, then the coordinates X and Z of $O_A$ and $O_B$ are 0; if a measurement origin of the laser displacement sensor is denoted as zero, then the coordinates X and Z of $O_C$ are 0;

the linear laser measuring instrument can obtain coordinate data in an XOZ plane, and coordinate data of the Y axis are obtained from the position of the light path of the linear laser measuring instrument on the grating guide rail; the coordinate origin $O_A$ of the linear laser measuring instrument at the position A is set as a world coordinate system origin, and if the coordinates of $O_A$ are calibrated as (0,0,0), and data measured by the linear laser measuring instrument at the position A are $(x_A, z_A)$, then three-dimensional coordinates at the position A are $(x_A, 0, z_A)$;

if a light path distance between the position A and the position B of the linear laser measuring instrument is $l_{AB}$, then coordinates of $O_B$ are calibrated as $(0,0, l_{AB})$; if data measured by the linear laser measuring instrument at the position B are $(x_B, z_B)$, then coordinates of the coordinate system $O_B$—$X_B Y_B Z_B$ in the coordinate system $O_A$—$X_A Y_A Z_A$ can be expressed as:

$$(x_B, y_B, z_B, 1) = (x_B, 0, z_B, 1)\begin{bmatrix} 1 & 0 & 0 & 0 \\ 0 & 1 & 0 & 0 \\ 0 & 0 & 1 & 0 \\ 0 & l_{AB} & 0 & 1 \end{bmatrix} \quad (1)$$

if a light path distance between the position A of the linear laser measuring instrument and the position C of the laser displacement sensor is $l_{AC}$, then coordinates of $O_C$ are calibrated as $(0,0, l_{AC})$; if data measured by the laser displacement sensor at the position C are $(z_C)$, then coordinates of the coordinate system $O_C$—$X_C Y_C Z_C$ in the coordinate system $O_A$—$X_A Y_A Z_A$ can be expressed as:

$$(x_C, y_C, z_C, 1) = (0, 0, z_C, 1) \begin{bmatrix} 1 & 0 & 0 & 0 \\ 0 & 1 & 0 & 0 \\ 0 & 0 & 1 & 0 \\ 0 & l_{AC} & 0 & 1 \end{bmatrix}. \quad (2)$$

Preferably, specific operations of the step (2) comprise that: when a normal axis of a detection section of the shaft workpiece is not collinear with the ideal reference axis, namely when a rotation angle θ around the X-axis direction and a rotation angle α around the Z-axis direction exist in the shaft workpiece and the detection system, a measurement section measured by the light path of the linear laser measuring instrument is an ellipse, wherein the minor axis of the ellipse is an axis diameter, an included angle exists between the major axis ac of the ellipse and the Z axis, and an included angle exists between the minor axis bd of the ellipse and the X axis; the ellipse center of the obtained ellipse profile is on the central axis, and an included angle between the measurement section and a cross section is λ, wherein if a length of the major axis ac of the ellipse is $l_{ac}$, and a length of the minor axis bd is $l_{bd}$, then a calculation equation of λ is:

$$\lambda = \arccos \frac{l_{bd}}{l_{ac}} \quad (3)$$

if a shaft gauge block is clamped in the workpiece clamping device, the linear laser measuring instrument is started to detect a section profile of the gauge block, and the gauge block is arranged in a measurement light path of the linear laser measuring instrument, then a cross section of the gauge block and the measurement light path is an elliptical profile; if a half-section profile arc ef of the gauge block at any position can be measured by the laser measuring instrument at the position A, then coordinates of profile points on the arc êf can be assumed as $Pn(x_n, 0, z_n)$, (n=1, 2, 3 . . . ), and the coordinate points meet equation (4):

$$ax_n^2 + bx_n z_n + cz_n^2 + dx_n + ez_n + f = 0 (n=1,2,3 \ldots) \quad (4)$$

in the equation, a, b, c, d, e and f are constant coefficients and are obtained by substituting into a coordinate point set;
a rotation angle ϕ of the major axis of the ellipse in the coordinate system $O_A$—$X_A Y_A Z_A$ is obtained by equation (5):

$$\phi = \frac{1}{2} \arctan \frac{b}{a-c} \quad (5)$$

if coordinates of a geometric center $O_U$ of the ellipse are assumed as $(x_U, z_U)$, then the coordinate points are obtained by equations (6) and (7):

$$x_U = \frac{b \times e - 2 \times c \times d}{4 \times a \times c - b^2} \quad (6)$$

$$z_U = \frac{b \times d - 2 \times a \times e}{4 \times a \times c - b^2} \quad (7)$$

the length $l_{ac}$ of the major axis and the length $l_{bd}$ of the minor axis can be obtained by equations (8) and (9), respectively:

$$l_{ac} = 2 \sqrt{\frac{-2f}{(a+c) - \sqrt{b^2 + \left(\frac{a-c}{f}\right)^2}}} \quad (8)$$

$$l_{bd} = 2 \sqrt{\frac{-2f}{(a+c) + \sqrt{b^2 + \left(\frac{a-c}{f}\right)^2}}} \quad (9)$$

the included angle λ between the measurement section of the gauge block and the concentric cross section thereof is obtained by equations (3), (4), (8) and (9);
the minor axis of the measurement section A profile of the gauge block is the diameter of the concentric cross section A profile thereof, $\vec{bd}$ is denoted as an $X_S$ axis of the coordinate system of the workpiece clamping device, the center $O_U$ of the measurement section A profile is denoted as an origin $O_S$ of the coordinate system of the workpiece clamping device, a central axis of the cross section A profile perpendicular to the gauge block is denoted as a $Y_S$ axis, and the coordinate system $O_S$—$X_S Y_S Z_S$ of the workpiece clamping device conforming to the right-hand rule is established;
a deviation amount between the coordinate system $O_A$—$X_A Y_A Z_A$ of the detection system and the coordinate system $O_S$—$X_S Y_S Z_S$ of the workpiece clamping device is $(x_U, 0, z_U, \phi, \lambda, 0)$, namely points (x,y,z) of the coordinate system of the detection system are translated by $x_u$ and $z_u$ in the X-axis and Z-axis directions, respectively, then rotate around the X axis by the angle λ, and then rotate around the Y axis by the angle ϕ, so that corresponding point coordinates (x',y', z') of the coordinate system $O_S$—$X_S Y_S Z_S$ of the workpiece clamping device may be obtained; therefore, a transformation relation between the coordinate system of the detection system and the coordinate system of the workpiece clamping device is:

$$\begin{pmatrix} x' \\ y' \\ z' \\ 1 \end{pmatrix} = \begin{bmatrix} \cos\lambda & 0 & \sin\lambda & 0 \\ 0 & 1 & 0 & 0 \\ -\sin\lambda & 0 & \cos\lambda & 0 \\ 0 & 0 & 0 & 1 \end{bmatrix} \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} x - x_U \\ y - 0 \\ z - z_U \\ 1 \end{bmatrix}. \quad (10)$$

Moreover, specific operations of the step (3) comprises that: the shaft workpiece is clamped in the calibrated workpiece clamping device, the light path of the linear laser measuring instrument is aligned to a reference shaft section of the shaft workpiece, and the linear laser measuring instrument is started for measurement at the position A and the position B; the linear laser measuring instrument is assumed at the position A, then coordinates of the obtained points of the section profile in the coordinate system $O_A$—$X_A Y_A Z_A$ are $P_i(x_i, 0, z_i, (i=1, 2, 3 \ldots)$, and the coordinate points meet equation (11):

$$a_1 x_n^2 + b_1 x_n z_n + c_1 z_n^2 + d_1 x_n + e_1 z_n + f_1 = 0 (n=1,2,3 \ldots) \quad (11)$$

the constants $a_1$, $b_1$, $c_1$, $d_1$, $e_1$ and $f_1$ can be obtained by solving the equation, and then the coordinate points are obtained by solving equations (12) and (13):

$$x_{U_A} = \frac{b_1 \times e_1 - 2 \times c_1 \times d_1}{4 \times a_1 \times c_1 - b_1^2} \quad (12)$$

$$z_{U_A} = \frac{b_1 \times d_1 - 2 \times a_1 \times e_1}{4 \times a_1 \times c_1 - b_1^2} \quad (13)$$

coordinates of the points of the section profile obtained by the linear laser measuring instrument at the measurement position B at a distance $l'_{AB}$ from the measurement position A in the coordinate system $O_A$—$X_A Y_A Z_A$ are $P_j(x_j, l'_{AB}, z_j)$, (j=1, 2, 3 ... ); the coordinate points meet equation (14):

$$a_2 x_n^2 + b_2 x_n z_n + c_2 z_n^2 + d_2 x_n + e_2 z_n + f_2 = 0 (n=1,2,3 \ldots) \quad (14)$$

$a_2$, $b_2$, $c_2$, $d_2$, $e_2$ and $f_2$ can be obtained by solving the equation, and then the coordinate points are obtained by solving equations (15) and (16):

$$x_{W_B} = \frac{b_2 \times e_2 - 2 \times c_2 \times d_2}{4 \times a_2 \times c_2 - b_2^2} \quad (15)$$

$$z_{W_B} = \frac{b_2 \times d_2 - 2 \times a_2 \times e_2}{4 \times a_2 \times c_2 - b_2^2} \quad (16)$$

central coordinates $O_{U_A}(x_{U_A}, 0, z_{U_A})$ and $O_{W_B}(x_{W_B}, l'_{AB}, z_{W_B})$ of the cross section of the workpiece corresponding to the section profiles at the measurement position A and the measurement position B can be obtained, respectively; then a straight line equation of the central axis of the reference shaft section in the coordinate system $O_A$—$X_A Y_A Z_A$ is:

$$\frac{x - x_{U_A}}{x_{W_B} - x_{U_A}} = \frac{y - 0}{l'_{AB} - 0} = \frac{z - z_{U_A}}{z_{W_B} - z_{U_A}}. \quad (17)$$

Furthermore, specific operations of the step (4) comprise that: coordinates of a real-time measurement point at the measurement position C are acquired by the laser displacement sensor by rotating the shaft workpiece, and coordinates at a certain moment are assumed as $C_1(0, y_{C1}, z_{C1})$; the linear laser measuring instrument acquires real-time profile point data at the moment at the rotation position, coordinates of the points of the section profile obtained by the linear laser measuring instrument at the position A in the coordinate system $O_A$—$X_A Y_A Z_A$ are assumed as $P_{i1}(x_{i1}, 0, z_{i1})$, (i=1, 2, 3 ... ), and the coordinate points meet equation (18):

$$a_{11} x_n^2 + b_{11} x_n z_n + c_{11} z_n^2 + d_{11} x_n + e_{11} z_n + f_{11} = 0 (n=1,2,3\ldots) \quad (18)$$

$a_{11}$, $b_{11}$, $c_{11}$, $d_{11}$, $e_{11}$ and $f_{11}$ can be obtained by solving the equation, and the coordinate points are obtained by solving equations (19) and (20):

$$x_{U_{A1}} = \frac{b_{11} \times e_{11} - 2 \times c_{11} \times d_{11}}{4 \times a_{11} \times c_{11} - b_{11}^2} \quad (19)$$

-continued $$z_{U_{A1}} = \frac{b_{11} \times d_{11} - 2 \times a_{11} \times e_{11}}{4 \times a_{11} \times c_{11} - b_{11}^2} \quad (20)$$

coordinates of the points of the section profile obtained by the linear laser measuring instrument at the moment at the measurement position B at a distance $l_{AB}''$ from the measurement position A in the coordinate system $O_A$—$X_A Y_A Z_A$ are assumed as $P_{j1}(x_{j1}, l_{AB}'', z_{j1})$, (j=1, 2, 3 ... ), and the coordinate points meet equation (21):

$$a'_{21} x_n^2 + b'_{21} x_n z_n + c'_{21} z_n^2 + d'_{21} x_n + e'_{21} z_n + f'_{21} = 0 (n=1,2,3\ldots) \quad (21)$$

$a'_{21}$, $b'_{21}$, $c'_{21}$, $d'_{21}$, $e'_{21}$ and $f'_{21}$ can be obtained by solving the equation, and the coordinate points are obtained by solving equations (22) and (23):

$$x_{W_{B1}} = \frac{b_{21} \times e_{21} - 2 \times c_{21} \times d_{21}}{4 \times a_{21} \times c_{21} - b_{21}^2} \quad (22)$$

$$z_{W_{B1}} = \frac{b_{21} \times d_{21} - 2 \times a_{21} \times e_{21}}{4 \times a_{21} \times c_{21} - b_{21}^2} \quad (23)$$

central coordinates $O_{U_{A1}}(x_{U_{A1}}, 0, z_{U_{A1}})$ and $O_{W_{B1}}(x_{W_{B1}}, l_{AB}'', z_{W_{B1}})$ of the reference shaft section at the moment can be obtained; a distance $d_1$ from the measurement point at the moment to the real-time central axis is obtained by solving a calculation equation:

$$d_1 = \left\| C_1 - \frac{(O_{W_{B1}} - O_{U_{A1}})(O_{W_{B1}} - O_{U_{A1}})^T}{(O_{W_{B1}} - O_{U_{A1}})^T (O_{W_{B1}} - O_{U_{A1}})} (C_1 - O_{U_{A1}}) \right\| \quad (24)$$

data recorded at each moment are measured by rotating the shaft workpiece for one circle, and a distance $d_i$ (i=1, 2, 3 ... ) from measurement points at all the moments to the real-time central axis is calculated and obtained;

a radial circle runout t of the shaft workpiece is obtained by a difference value between a maximum value $d_{max}$ and a minimum value $d_{min}$ in the distance $d_i$ (i=1, 2, 3 ... ) from the real-time measurement points to the real-time central axis, and a calculation equation is:

$$t = d_{max} - d_{min} \quad (25)$$

Moreover, specific operations of the step (5) comprise that: firstly, the measurement position A and the measurement position B of the reference shaft section of the shaft workpiece are subjected to profile detection by using the linear laser measuring instrument, real-time profile point data at a certain rotation position are obtained by the linear laser measuring instrument, coordinates of the points of the section profile obtained by the linear laser measuring instrument at the position A at the moment in the coordinate system $O_A$—$X_A Y_A Z_A$ are assumed as $P'_{i1}(x'_{i1}, 0, z'_{i1})$, (i=1, 2, 3 ... ), and the coordinate points meet equation (26):

$$a'_{11} x'^2_{i1} + b'_{11} x'_{i1} z'_{i1} + c'_{11} z'^2_{i1} + d'_{11} x'_{i1} + e'_{11} z'_{i1} + f'_{11} = 0 \\ (i=1,2,3\ldots) \quad (26)$$

$a'_{11}$, $b'_{11}$, $c'_{11}$, $d'_{11}$, $e'_{11}$ and $f'_{11}$ can be obtained by solving the equation, and the coordinate points are obtained by solving equations (27) and (28):

$$x'_{U_{A1}} = \frac{b'_{11} \times e'_{11} - 2 \times c'_{11} \times d'_{11}}{4 \times a'_{11} \times c'_{11} - b'^2_{11}} \quad (27)$$

$$z'_{U_{A1}} = \frac{b'_{11} \times d'_{11} - 2 \times a'_{11} \times e'_{11}}{4 \times a'_{11} \times c'_{11} - b'^2_{11}} \quad (28)$$

coordinates of the points of the section profile obtained by the linear laser measuring instrument at the moment at the position B at a distance $l'''_{AB}$ from the position A in the coordinate system $O_A$—$X_AY_AZ_A$ are assumed as $P'_{j1}(x'_{j1}, l'''_{AB}, z'_{j1})$, (j=1, 2, 3 . . . ), and the coordinate points meet equation (29):

$$a'_{21}x'^2_{j1} + b'_{21}x'_{j1}z'_{j1} + c'_{21}z'^2_{j1} + d'_{21}x'_{j1} + e'_{21}z'_{j1} + f'_{21} = 0 \quad (i=1,2,3 \ldots) \quad (29)$$

$a'_{21}$, $b'_{21}$, $c'_{21}$, $d'_{21}$, $e'_{21}$ and $f'_{21}$ can be obtained by solving the equation, and the coordinate points are obtained by solving equations (30) and (31):

$$x'_{W_{B1}} = \frac{b'_{11} \times e'_{11} - 2 \times c'_{11} \times d'_{11}}{4 \times a'_{11} \times c'_{11} - b'^2_{11}} \quad (30)$$

$$z'_{W_{B1}} = \frac{b'_{11} \times d'_{11} - 2 \times a'_{11} \times e'_{11}}{4 \times a'_{11} \times c'_{11} - b'^2_{11}} \quad (31)$$

central coordinates $O'_{U_{A1}}(x'_{U_{A1}}, 0, z'_{U_{A1}})$ and $O'_{W_{B1}}(x'_{W_{B1}}, l'''_{AB}, z'_{W_{B1}})$ of the reference shaft section at the moment can be obtained, and a straight line equation of the central axis of the reference shaft section at the moment in the coordinate system $O_A$—$X_AY_AZ_A$ is:

$$\frac{x - x'_{U_{A1}}}{x'_{W_{B1}} - x'_{U_{A1}}} = \frac{y - 0}{l'''_{AB} - 0} = \frac{z - z'_{U_{A1}}}{z'_{W_{B1}} - z'_{U_{A1}}} \quad (32)$$

the linear laser measuring instrument is moved to a position C' of the workpiece detection shaft section along the $Y_A$-axis direction, a moving distance l' is obtained by the grating guide rail, coordinates of the points of the section profile obtained by the linear laser measuring instrument at the moment at the position C' in the coordinate system $O_A$—$X_AY_AZ_A$ are assumed as $P_{k1}(X_{k1}, l', Z_{k1})$, (k=1, 2, 3 . . . ), and the coordinate points meet equation (33):

$$a_3x_k^2 + b_3x_kz_k + c_3z_k^2 + d_3x_k + e_3z_k + f_3 = 0 (k=1,2,3 \ldots) \quad (33)$$

$a_3$, $b_3$, $c_3$, $d_3$, $e_3$ and $f_3$ can be obtained by solving the equation, and the coordinate points are obtained by solving equations (34) and (35):

$$x_{U_{C'}} = \frac{b_3 \times e_3 - 2 \times c_3 \times d_3}{4 \times a_3 \times c_3 - b_3^2} \quad (34)$$

$$z_{U_{C'}} = \frac{b_3 \times d_3 - 2 \times a_3 \times e_3}{4 \times a_3 \times c_3 - b_3^2} \quad (35)$$

the detection is performed repeatedly for several times at different positions to obtain central coordinates $O'_{U_{Ai}}(x'_{U_{Ai}}, 0, z'_{U_{Ai}})$ and $O'_{W_{Bi}}(x'_{W_{Bi}}, l'''_{AB}, z'_{W_{Bi}})$ (i=1, 2, 3 . . . ) of the reference shaft section, and a central coordinate point set of the cross section of the measurement section is denoted as $C'_i(x_{C'i}, l', z_{C'i})$(i=1, 2, 3 . . . ); a distance $d'_i$ from the central coordinate points of the cross section of the detection shaft section to the central axis of the reference section is obtained by a calculation equation:

$$d'_i = \left\| C'_i - \frac{(O'_{W_{Bi}} - O'_{U_{Ai}})(O'_{W_{Bi}} - O'_{U_{Ai}})^T}{(O'_{W_{Bi}} - O'_{U_{Ai}})^T(O'_{W_{Bi}} - O'_{U_{Ai}})}(C'_i - O'_{U_{Ai}}) \right\| (i = 1, 2, 3 \ldots) \quad (36)$$

coaxiality φt of the detection shaft section of the shaft workpiece is obtained by a difference value between a maximum value $d'_{max}$ and a minimum value $d'_{min}$ in the distance $d'_i$ from the obtained central coordinate points of the cross section of the detection shaft section to the central axis of the reference section, and a calculation equation is:

$$\varphi t = d'_{max} - d'_{min} \quad (37).$$

Preferably, the shaft workpiece is the camshaft, the linear laser measuring instrument continuously acquires data of a convex peach of a camshaft cam, and the acquired data are calculated and analyzed to obtain machining precision of profile degree of the camshaft cam;

the linear laser measuring instrument is moved to the convex peach of the cam, data acquisition is performed once when the linear laser measuring instrument moves for a short distance, data coordinates of the coordinate system $O_A$—$X_AY_AZ_A$ obtained by acquisition are converted into coordinates of the coordinate system $O_S$—$X_SY_SZ_S$ of the workpiece clamping device through an algorithm, and profile points are fit and compared with a standard cam profile to calculate the profile degree.

Beneficial effects: The present invention has the following remarkable advantages compared with the prior art: firstly, the circle center of the shaft neck of the shaft workpiece and the ideal reference axis of the shaft workpiece can be detected in real time, thereby avoiding system errors and compensation difficulties caused by the conventional use of a thimble reference or a V-shaped block, and space coordinates of all aspects can be obtained by establishing non-contact measurement coordinate systems; the high-precision machining precision detection process is allowed to be directly performed on a processing site, damages to a processed workpiece and losses of detection instruments are avoided by non-contact measurement, and through point-surface combination, the influence of a complex calibration process and a clamping position of a part is avoided, and positioning errors caused by clamping for several times are avoided; compared with other detection methods, the method disclosed herein has the advantages of high reliability, high detection efficiency and short time, can realize in-place non-contact detection of large-size shaft workpieces, has high degree of freedom, does not depend on constraints of conventional fixed clamps, and has wide applicability.

DETAILED DESCRIPTION

The technical scheme of the present invention is further described below with reference to the drawings.

Figure 1:
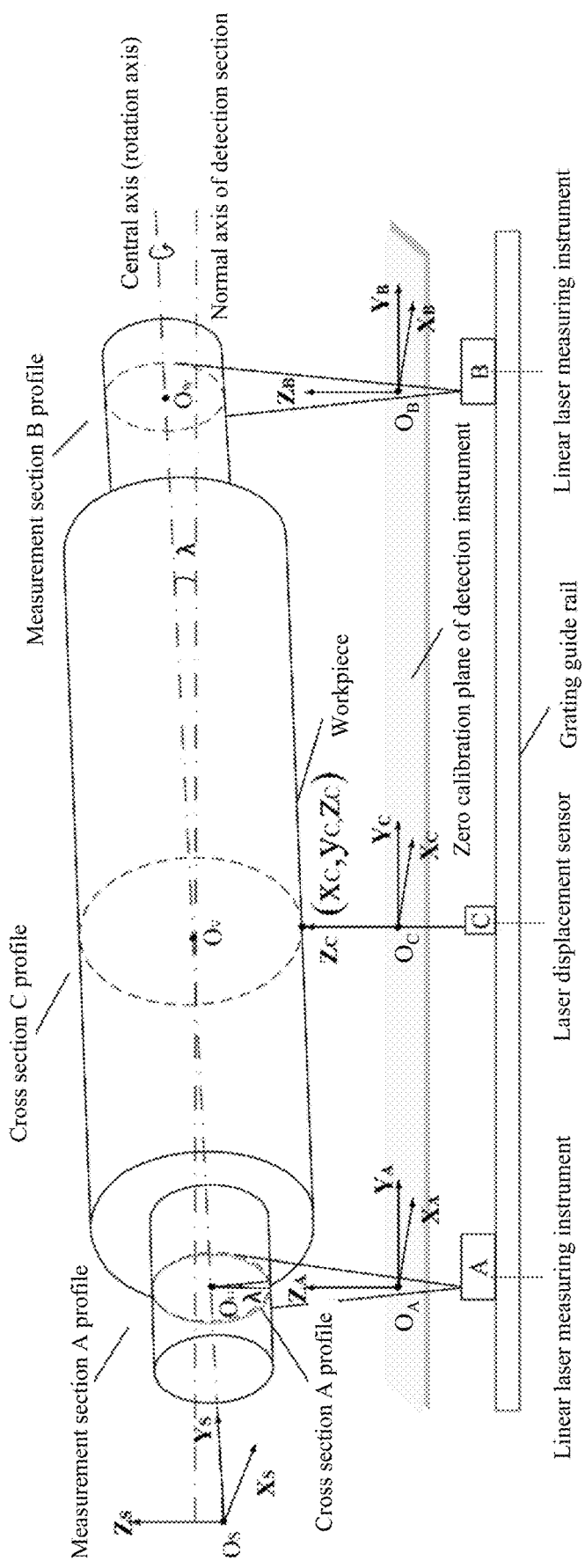
FIG. 1 is a schematic diagram of the coordinate systems of the detection system according to the present invention.

Firstly, coordinate systems of a detection system and a workpiece clamping device are established to be consistent, coordinate data of a middle shaft are subjected to in-place measurement to obtain a reference central axis, and finally, a detection result of shaft runout is obtained, and the coordinate system of the detection system is constructed as shown in FIG. 1. Section profiles at a measurement position A and a measurement position B of a reference shaft section are measured by using the linear laser measuring instrument fixed on a grating guide rail, wherein fitting circle centers of the measurement section profiles are $O_U$ and $O_W$, respectively; a runout detection shaft section at a measurement position C is measured by a laser displacement sensor, wherein a measurement point is on a cross section taking $O_V$ as a circle center, and $O_V$ is on the central axis. As there is a deviation between the positions of the detection system and the workpiece, an included angle $\lambda$ exists between the measurement section profiles and the concentric cross section profile taking the central axis as a normal vector. In the method, a coordinate origin $O_A$ established by the linear laser measuring instrument on the laser guide rail at the position A is taken as a world coordinate system origin, and an XOZ plane of the linear laser measuring instrument is taken as an XOZ plane of the world coordinate system; and then a world coordinate system $O_A$—$X_A Y_A Z_A$ based on the detection system is established, a coordinate system of the linear laser measuring instrument on the grating guide rail at the position B is $O_B$—$X_B Y_B Z_B$, and a coordinate system of the laser displacement sensor on the grating guide rail at the position C is $O_C$—$X_C Y_C Z_C$.

Therefore, in order to obtain reference central axes $O_A O_B$ and coordinates ($x_C$, $y_C$, $z_C$) of a measurement point in the world coordinate system $O_A$—$X_A Y_A Z_A$, it is necessary to convert the coordinate systems $O_B$—$X_B Y_B Z_B$ and $O_C$—$X_C Y_C Z_C$ into the world coordinate system $O_A$—$X_A Y_A Z_A$ and to determine a coordinate system $O_S$—$X_S Y_S Z_S$ of the workpiece clamping device. Then, the workpiece can be measured, and algorithm calculations such as runout error are carried out on measurement data to obtain errors such as workpiece runout.

Figure 2:
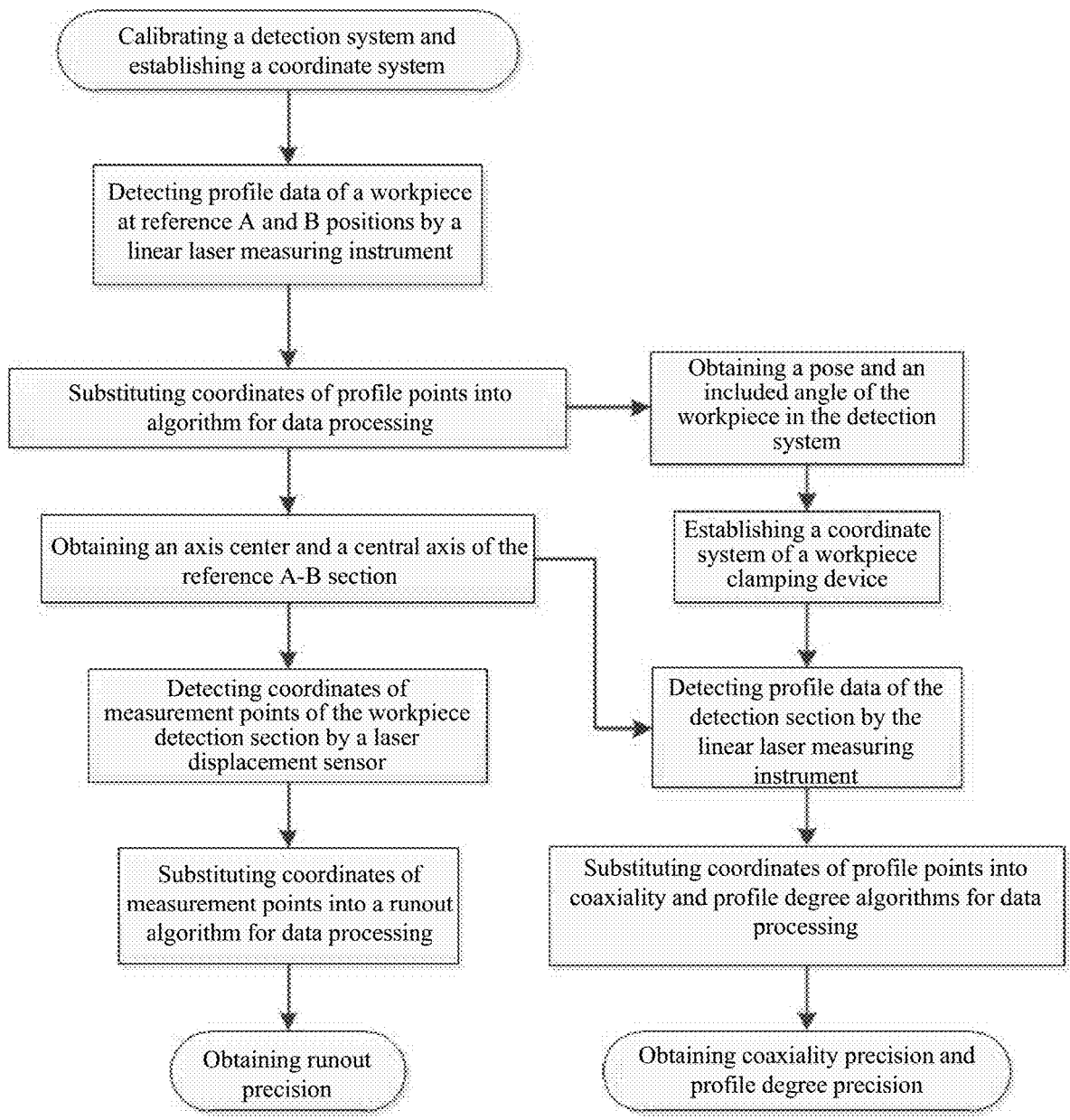
FIG. 2 is a schematic diagram of a procedure according to the present invention.
Figure 3:
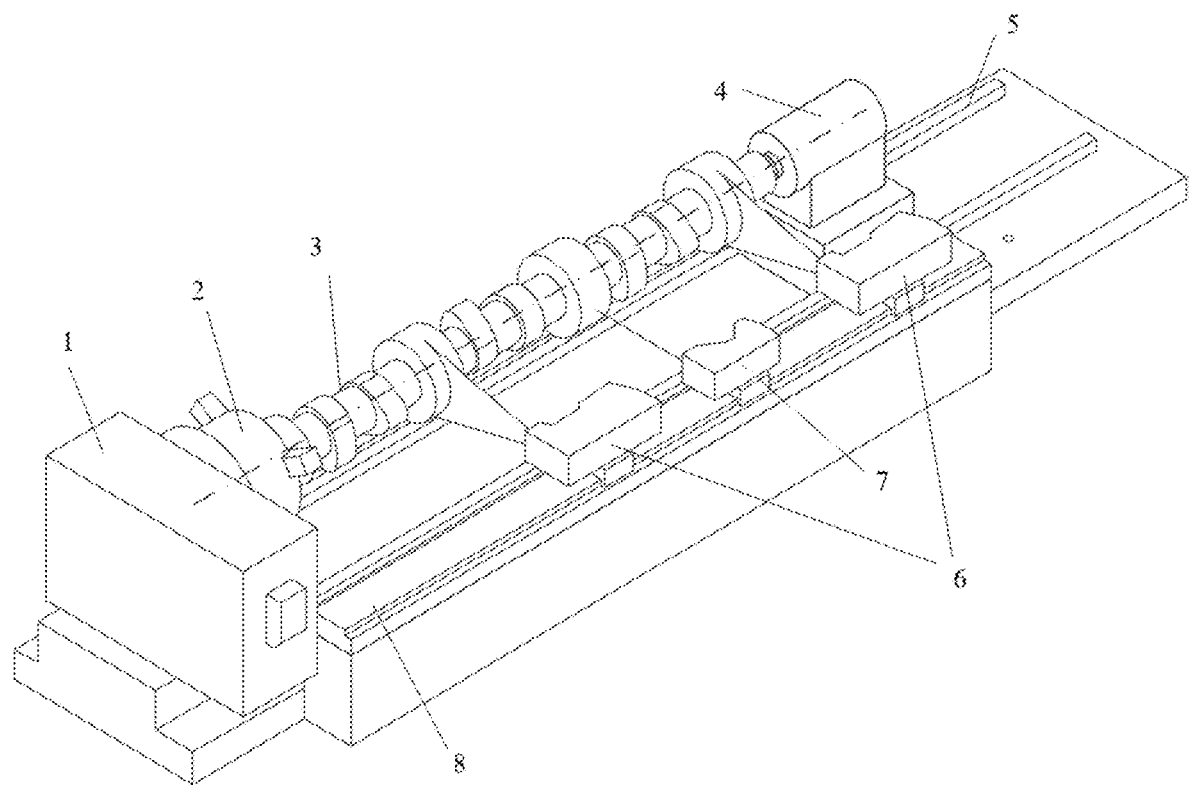
FIG. 3 is a schematic diagram of structures of the detection system and the workpiece clamping device according to the present invention.
Figure 4:
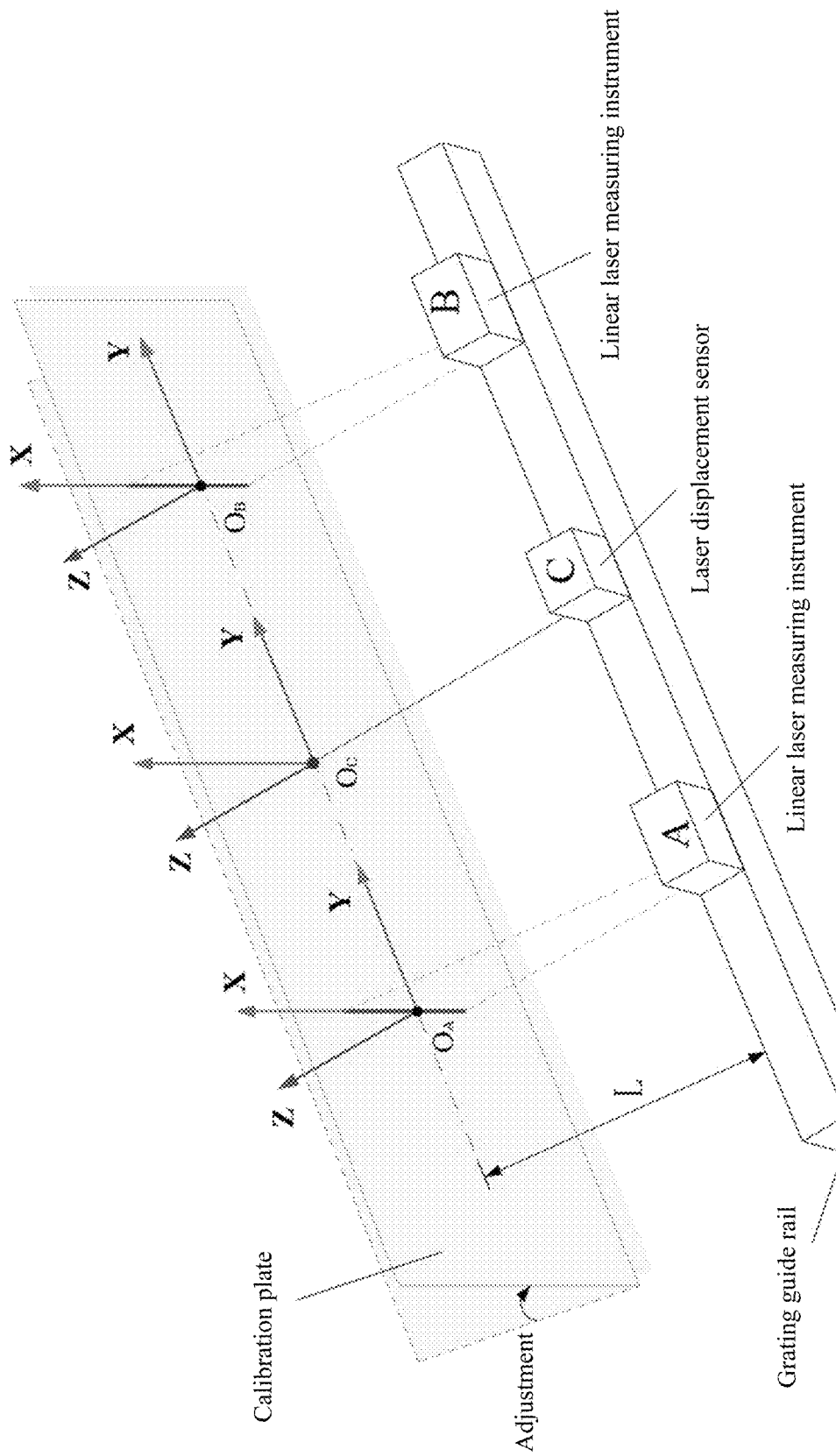
FIG. 4 is a schematic diagram of the calibrated coordinate systems of the detection system according to the present invention.
Figure 5:
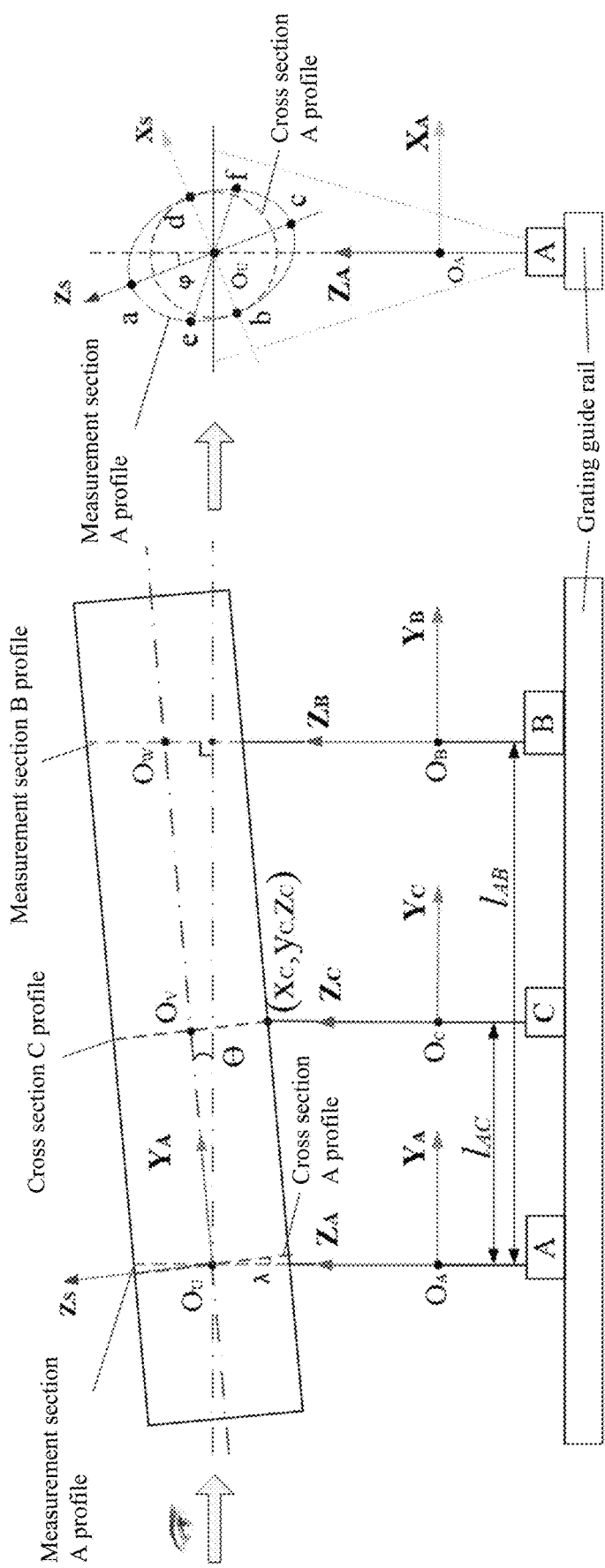
FIG. 5 is a schematic diagram of the coordinate system of the cross section of the gauge block measured by the linear laser measuring instrument according to the present invention.

As shown in FIG. 1 and FIG. 2, the in-place non-contact detection method for a shaft workpiece disclosed herein comprises:

(1) establishing a detection system, calibrating the detection system and establishing a detection coordinate system;

as shown in FIG. 3 and FIG. 4, the detection system comprises a grating guide rail 8 positioned on one side of the machine tool, and a measurement position A, a measurement position C and a measurement position B positioned on the grating guide rail at intervals in sequence, wherein the measurement position A is measured by the linear laser measuring instrument 6, the measurement position C is measured by the laser displacement sensor 7, the measurement position B is measured by the linear laser measuring instrument 6, and the linear laser measuring instrument 6 and the laser displacement sensor 7 are mounted on slide blocks of the grating guide rail 8; the measurement position A and the measurement position B are reference positions required to be detected, and the measurement position C is a position required to be subjected to detection of runout, coaxiality and profile degree; as shown in FIG. 4, the flatness of the linear laser measuring instrument, the laser displacement sensor and the grating straight guide rail is adjusted to reach 0.001 mm, the measuring directions of the linear laser measuring instrument and the laser displacement sensor are consistent, a calibration plate is placed at a distance L in front of the measuring directions, and a calibration plane of the calibration plate is adjusted to be orthogonal to a light path of the linear laser measuring instrument and to be perpendicular to a light path of the laser displacement sensor; wherein an XOY plane of the linear laser measuring instrument is parallel to the calibration plane of the calibration plate, the light path of the laser displacement sensor is perpendicular to the XOY plane, and the mounting direction of the laser displacement sensor on the grating guide rail is parallel to the Y axis; a coordinate system $O_A$—$X_A Y_A Z_A$ and a coordinate system $O_B$—$X_B Y_B Z_B$ of the linear laser measuring instrument at the position A and the position B are established; then the coordinate systems are adjusted to enable light spots of the laser displacement sensor to be on the Y axis of the light path of the linear laser measuring instrument, and a coordinate system $O_C$—$X_C Y_C Z_C$ of the laser displacement sensor at the position C is established; if measurement origins of the linear laser measuring instrument are denoted as zero, then the coordinates X and Z of $O_A$ and $O_B$ are 0; if a measurement origin of the laser displacement sensor is denoted as zero, then the coordinates X and Z of $O_C$ are 0;

the linear laser measuring instrument can obtain coordinate data in an XOZ plane, and coordinate data of the Y axis are obtained from the position of the light path of the linear laser measuring instrument on the grating guide rail; the coordinate origin $O_A$ of the linear laser measuring instrument at the position A is set as a world coordinate system origin, and if the coordinates of $O_A$ are calibrated as (0,0,0), and data measured by the linear laser measuring instrument at the position A are ($x_A$, $z_A$), then three-dimensional coordinates at the position A are ($x_A$, 0, $z_A$);

if a light path distance between the position A and the position B of the linear laser measuring instrument is $l_{AB}$, then coordinates of $O_B$ are calibrated as (0,0, $l_{AB}$); if data measured by the linear laser measuring instrument at the position B are ($x_B$, $z_B$), then coordinates of the coordinate system $O_B$—$X_B Y_B Z_B$ in the coordinate system $O_A$—$X_A Y_A Z_A$ can be expressed as:

$$(x_B, y_B, z_B, 1) = (x_B, 0, z_B, 1) \begin{bmatrix} 1 & 0 & 0 & 0 \\ 0 & 1 & 0 & 0 \\ 0 & 0 & 1 & 0 \\ 0 & l_{AB} & 0 & 1 \end{bmatrix} \quad (1)$$

if a light path distance between the position A of the linear laser measuring instrument and the position C of the laser displacement sensor is $l_{AC}$, then coordinates of $O_C$ are calibrated as $(0,0, l_{AC})$; if data measured by the laser displacement sensor at the position C are $(z_C)$, then coordinates of the coordinate system $O_C$—$X_CY_CZ_C$ in the coordinate system $O_A$—$X_AY_AZ_A$ can be expressed as:

$$(x_C, y_C, z_C, 1) = (0, 0, z_C, 1)\begin{bmatrix} 1 & 0 & 0 & 0 \\ 0 & 1 & 0 & 0 \\ 0 & 0 & 1 & 0 \\ 0 & l_{AC} & 0 & 1 \end{bmatrix} \quad (2)$$

coordinate data of the workpiece in the coordinate system $O_A$—$X_AY_AZ_A$ can be acquired by using the laser sensor of the detection system and then calculated and analyzed;

(2) analyzing a pose of the workpiece in the detection system to establish a coordinate system of a workpiece clamping device;

as shown in FIG. 3 and FIG. 5, the workpiece clamping device comprises a clamping bed control box 1, a clamping bed chuck 2, a camshaft 3 to be detected, a thimble 4 and a thimble slide rail 5, and when a normal axis of a detection section of the shaft workpiece is not collinear with the ideal reference axis, namely when a rotation angle θ around the X-axis direction and a rotation angle α around the Z-axis direction exist in the shaft workpiece and the detection system, a measurement section measured by the light path of the linear laser measuring instrument is an ellipse, wherein the minor axis of the ellipse is an axis diameter, an included angle exists between the major axis ac of the ellipse and the Z axis, and an included angle exists between the minor axis bd of the ellipse and the X axis; the ellipse center of the obtained ellipse profile is on the central axis, and an included angle between the measurement section and a cross section is X, wherein if a length of the major axis ac of the ellipse is $l_{ac}$, and a length of the minor axis bd is $l_{bd}$, then a calculation equation of λ is:

$$\lambda = \arccos \frac{l_{bd}}{l_{ac}} \quad (3)$$

if a shaft gauge block is clamped in the workpiece clamping device, the linear laser measuring instrument is started to detect a section profile of the gauge block, and the gauge block is arranged in a measurement light path of the linear laser measuring instrument, then a cross section of the gauge block and the measurement light path is an elliptical profile; if a half-section profile arc $\hat{ef}$ of the gauge block at any position can be measured by the laser measuring instrument at the position A, then coordinates of profile points on the arc $\hat{ef}$ can be assumed as $Pn(x_n, 0, z_n)$, $(n=1, 2, 3 \ldots )$, and the coordinate points meet equation (4):

$$ax_n^2+bx_nz_n+cz_n^2+dx_n+ez_n+f=0(n=1,2,3\ldots) \quad (4)$$

in the equation, a, b, c, d, e and f are constant coefficients and are obtained by substituting into a coordinate point set;

a rotation angle φ of the major axis of the ellipse in the coordinate system $O_A$—$X_AY_AZ_A$ is obtained by equation (5):

$$\phi = \frac{1}{2}\arctan\frac{b}{a-c} \quad (5)$$

if coordinates of a geometric center $O_U$ of the ellipse are assumed as $(x_U, z_U)$, then the coordinate points are obtained by equations (6) and (7):

$$x_U = \frac{b\times e - 2\times c\times d}{4\times a\times c - b^2} \quad (6)$$

$$z_U = \frac{b\times d - 2\times a\times e}{4\times a\times c - b^2} \quad (7)$$

the length $l_{ac}$ of the major axis and the length $l_{bd}$ of the minor axis can be obtained by equations (8) and (9), respectively:

$$l_{ac} = 2\sqrt{\frac{-2f}{(a+c) - \sqrt{b^2 + \left(\frac{a-c}{f}\right)^2}}} \quad (8)$$

$$l_{bd} = 2\sqrt{\frac{-2f}{(a+c) + \sqrt{b^2 + \left(\frac{a-c}{f}\right)^2}}} \quad (9)$$

the included angle λ between the measurement section of the gauge block and the concentric cross section thereof is obtained by equations (3), (4), (8) and (9);

the minor axis of the measurement section A profile of the gauge block is the diameter of the concentric cross section A profile thereof, $\overrightarrow{bd}$ is denoted as an $X_S$ axis of the coordinate system of the workpiece clamping device, the center $O_U$ of the measurement section A profile is denoted as an origin $O_S$ of the coordinate system of the workpiece clamping device, a central axis of the cross section A profile perpendicular to the gauge block is denoted as a $Y_S$ axis, and the coordinate system $O_S$—$X_SY_SZ_S$ of the workpiece clamping device conforming to the right-hand rule is established;

a deviation amount between the coordinate system $O_A$—$X_AY_AZ_A$ of the detection system and the coordinate system $O_S$—$X_SY_SZ_S$ of the workpiece clamping device is $(x_U, 0, z_U, \phi, \lambda, 0)$, namely points (x,y,z) of the coordinate system of the detection system are translated by $x_u$ and $z_u$ in the X-axis and Z-axis directions, respectively, then rotate around the X axis by the angle λ, and then rotate around the Y axis by the angle φ, so that corresponding point coordinates (x', y', z') of the coordinate system $O_S$—$X_SY_SZ_S$ of the workpiece clamping device may be obtained; therefore, a transformation relation between the coordinate system of the detection system and the coordinate system of the workpiece clamping device is:

$$\begin{pmatrix} x' \\ y' \\ z' \\ 1 \end{pmatrix} = \begin{bmatrix} \cos\lambda & 0 & \sin\lambda & 0 \\ 0 & 1 & 0 & 0 \\ -\sin\lambda & 0 & \cos\lambda & 0 \\ 0 & 0 & 0 & 1 \end{bmatrix}\begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix}\begin{bmatrix} x - x_U \\ y - 0 \\ z - z_U \\ 1 \end{bmatrix} \quad (10)$$

(3) controlling the workpiece clamping device of a shaft workpiece processing machine tool to rotate, continuously acquiring data by a linear laser measuring instrument, and calculating and analyzing the acquired data to obtain an ideal reference axis of the shaft workpiece; the shaft workpiece is clamped in the calibrated workpiece clamping device, the light path of the linear laser measuring instrument is aligned to a reference shaft section of the shaft workpiece, and the linear laser measuring instrument is started for measurement at the position A and the position B; the linear laser measuring instrument is assumed at the position A, then coordinates of the obtained points of the section profile in the coordinate system $O_A$—$X_A Y_A Z_A$ are $P_i(x_i, 0, z_i)$, (i=1, 2, 3 . . . ), and the coordinate points meet equation (11):

$$a_1 x_n^2 + b_1 x_n z_n + c_1 z_n^2 + d_1 x_n + e_1 z_n + f_1 = 0 (n=1,2,3 \ldots) \quad (11)$$

the constants $a_1$, $b_1$, $c_1$, $d_1$, $e_1$ and $f_1$ can be obtained by solving the equation, and then the coordinate points are obtained by solving equations (12) and (13):

$$x_{U_A} = \frac{b_1 \times e_1 - 2 \times c_1 \times d_1}{4 \times a_1 \times c_1 - b_1^2} \quad (12)$$

$$z_{U_A} = \frac{b_1 \times d_1 - 2 \times a_1 \times e_1}{4 \times a_1 \times c_1 - b_1^2} \quad (13)$$

coordinates of the points of the section profile obtained by the linear laser measuring instrument at the measurement position B at a distance $l'_{AB}$ from the measurement position A in the coordinate system $O_A$—$X_A Y_A Z_A$ are $P_j(x_j, l'_{AB}, z_j)$, (j=1,2,3); the coordinate points meet equation (14):

$$a_2 x_n^2 + b_2 x_n z_n + c_2 z_n^2 + d_2 x_n + e_2 z_n + f_2 = 0 (n=1,2,3 \ldots) \quad (14)$$

$a_2$, $b_2$, $c_2$, $d_2$, $e_2$ and $f_2$ can be obtained by solving the equation, and then the coordinate points are obtained by solving equations (15) and (16):

$$x_{W_B} = \frac{b_2 \times e_2 - 2 \times c_2 \times d_2}{4 \times a_2 \times c_2 - b_2^2} \quad (15)$$

$$z_{W_B} = \frac{b_2 \times d_2 - 2 \times a_2 \times e_2}{4 \times a_2 \times c_2 - b_2^2} \quad (16)$$

central coordinates $O_{U_A}(x_{U_A}, 0, z_{U_A})$ and $O_{W_B}(x_{W_B}, l'_{AB}, z_{W_B})$ of the cross section of the workpiece corresponding to the section profiles at the measurement position A and the measurement position B can be obtained, respectively; then a straight line equation of the central axis of the reference shaft section in the coordinate system $O_A$—$X_A Y_A Z_A$ is:

$$\frac{x - x_{U_A}}{x_{W_B} - x_{U_A}} = \frac{y - 0}{l'_{AB} - 0} = \frac{z - z_{U_A}}{z_{W_B} - z_{U_A}} \quad (17)$$

(4) continuously acquiring data of a detection part by a laser displacement sensor, and calculating and analyzing the acquired data to obtain actual machining precision of runout of a shaft neck of a camshaft; and coordinates of a real-time measurement point at the measurement position C are acquired by the laser displacement sensor by rotating the shaft workpiece, and coordinates at a certain moment are assumed as $C_1(0, y_{C1}, z_{C1})$; the linear laser measuring instrument acquires real-time profile point data at the moment at the rotation position, coordinates of the points of the section profile obtained by the linear laser measuring instrument at the position A in the coordinate system $O_A$—$X_A Y_A Z_A$ are assumed as $P_{i1}(x_{i1}, 0, z_{i1})$, (i=1, 2, 3 . . . ), and the coordinate points meet equation (18):

$$a_{11} x_n^2 + b_{11} x_n z_n + c_{11} z_n^2 + d_{11} x_n + e_{11} z_n + f_{11} = 0 (n=1,2,3 \ldots) \quad (18)$$

$a_{11}$, $b_{11}$, $c_{11}$, $d_{11}$, $e_{11}$ and $f_{11}$ can be obtained by solving the equation, and the coordinate points are obtained by solving equations (19) and (20):

$$x_{U_{A1}} = \frac{b_{11} \times e_{11} - 2 \times c_{11} \times d_{11}}{4 \times a_{11} \times c_{11} - b_{11}^2} \quad (19)$$

$$z_{U_{A1}} = \frac{b_{11} \times d_{11} - 2 \times a_{11} \times e_{11}}{4 \times a_{11} \times c_{11} - b_{11}^2} \quad (20)$$

coordinates of the points of the section profile obtained by the linear laser measuring instrument at the moment at the measurement position B at a distance $l_{AB}''$ from the measurement position A in the coordinate system $O_A$—$X_A Y_A Z_A$ are assumed as $P_{j1}(x_{j1}, l_{AB}'', z_{j1})$, (j=1, 2, 3 . . . ), and the coordinate points meet equation (21):

$$a_{21} x_n^2 + b_{21} x_n z_n + c_{21} z_n^2 + d_{21} x_n + e_{21} z_n + f_{21} = 0 (n=1,2,3 \ldots) \quad (21)$$

$a_{21}$, $b_{21}$, $c_{21}$, $d_{21}$, $e_{21}$ and $f_{21}$ can be obtained by solving the equation, and the coordinate points are obtained by solving equations (22) and (23):

$$x_{W_{B1}} = \frac{b_{21} \times e_{21} - 2 \times c_{21} \times d_{21}}{4 \times a_{21} \times c_{21} - b_{21}^2} \quad (22)$$

$$z_{W_{B1}} = \frac{b_{21} \times d_{21} - 2 \times a_{21} \times e_{21}}{4 \times a_{21} \times c_{21} - b_{21}^2} \quad (23)$$

central coordinates $O_{U_{A1}}(x_{U_{A1}}, 0, z_{U_{A1}})$ and $O_{W_{B1}}(x_{W_{B1}}, l_{AB}'', z_{W_{B1}})$ of the reference shaft section at the moment can be obtained; a distance $d_1$ from the measurement point at the moment to the real-time central axis is obtained by solving a calculation equation:

$$d_1 = \left\| C_1 - \frac{(O_{W_{B1}} - O_{U_{A1}})(O_{W_{B1}} - O_{U_{A1}})^T}{(O_{W_{B1}} - O_{U_{A1}})^T (O_{W_{B1}} - O_{U_{A1}})} (C_1 - O_{U_{A1}}) \right\| \quad (24)$$

data recorded at each moment are measured by rotating the shaft workpiece for one circle, and a distance $d_i$ (i=1, 2, 3 . . . ) from measurement points at all the moments to the real-time central axis is calculated and obtained;
a radial circle runout t of the shaft workpiece is obtained by a difference value between a maximum value $d_{max}$ and a minimum value $d_{min}$ in the distance $d_i$ (i=1, 2, 3 . . . ) from the real-time measurement points to the real-time central axis, and a calculation equation is:

$$t = d_{max} - d_{min} \quad (25)$$

the central axis detected in real time is used, so that the influence caused by the rotation eccentricity of the workpiece clamping device can be avoided, and the calculation precision is improved;
(5) continuously acquiring data of the detection part by adopting the linear laser measuring instrument, and calculating and analyzing the acquired data to obtain machining precision of coaxiality of the shaft workpiece;

firstly, the measurement position A and the measurement position B of the reference shaft section of the shaft workpiece are subjected to profile detection by using the linear laser measuring instrument, real-time profile point data at a certain rotation position are obtained by the linear laser measuring instrument, coordinates of the points of the section profile obtained by the linear laser measuring instrument at the position A at the moment in the coordinate system $O_A$—$X_A Y_A Z_A$ are assumed as $P'_{i1}(x'_{i1}, 0, z'_{i1})$, (i=1, 2, 3 . . . ), and the coordinate points meet equation (26):

$$a'_{11}x'^2_{i1}+b'_{11}x'_{i1}z_{i1}+c'_{11}z'^2_{i1}+d'_{11}x'_{i1}+e'_{11}z'_{i1}+f'_{11}=0 \quad (i=1,2,3\ldots) \tag{26}$$

$a'_{11}$, $b'_{11}$, $c'_{11}$, $d'_{11}$, $e'_{11}$ and $f'_{11}$ can be obtained by solving the equation, and the coordinate points are obtained by solving equations (27) and (28):

$$x'_{U_{A1}} = \frac{b'_{11} \times e'_{11} - 2 \times c'_{11} \times d'_{11}}{4 \times a'_{11} \times c'_{11} - b'^2_{11}} \tag{27}$$

$$z'_{U_{A1}} = \frac{b'_{11} \times d'_{11} - 2 \times a'_{11} \times e'_{11}}{4 \times a'_{11} \times c'_{11} - b'^2_{11}} \tag{28}$$

coordinates of the points of the section profile obtained by the linear laser measuring instrument at the moment at the position B at a distance $l'''_{AB}$ from the position A in the coordinate system $O_A$—$X_A Y_A Z_A$ are assumed as $P'_{j1}(x'_{j1}, l'''_{AB}, z'_{j1})$, (j=1, 2, 3 . . . ), and the coordinate points meet equation (29):

$$a'_{21}x'^2_{i1}+b'_{21}x'_{i1}z_{i1}+c'_{21}z'^2_{i1}+d'_{21}x'_{i1}+e'_{21}z'_{i1}+f'_{21}=0 \quad (i=1,2,3\ldots) \tag{29}$$

$a'_{21}$, $b'_{21}$, $c'_{21}$, $d'_{21}$, $e'_{21}$ and $f'_{21}$ can be obtained by solving the equation, and the coordinate points are obtained by solving equations (30) and (31):

$$x'_{W_{B1}} = \frac{b'_{11} \times e'_{11} - 2 \times c'_{11} \times d'_{11}}{4 \times a'_{11} \times c'_{11} - b'^2_{11}} \tag{30}$$

$$z'_{W_{B1}} = \frac{b'_{11} \times d'_{11} - 2 \times a'_{11} \times e'_{11}}{4 \times a'_{11} \times c'_{11} - b'^2_{11}} \tag{31}$$

central coordinates $O'_{U_{A1}}(x'_{U_{A1}}, 0, z'_{U_{A1}})$ and $O'_{W_{B1}}(x'_{W_{B1}}, l'''_{AB}, z'_{W_{B1}})$ of the reference shaft section at the moment can be obtained, and a straight line equation of the central axis of the reference shaft section at the moment in the coordinate system $O_A$—$X_A Y_A Z_A$ is:

$$\frac{x - x'_{U_{A1}}}{x'_{W_{B1}} - x'_{U_{A1}}} = \frac{y - 0}{l''_{AB} - 0} = \frac{z - z'_{U_{A1}}}{z'_{W_{B1}} - z'_{U_{A1}}} \tag{32}$$

the linear laser measuring instrument is moved to a position C' of the workpiece detection shaft section along the $Y_A$-axis direction, a moving distance l' is obtained by the grating guide rail, coordinates of the points of the section profile obtained by the linear laser measuring instrument at the moment at the position C' in the coordinate system $O_A$—$X_A Y_A Z_A$ are assumed as $P_{k1}(X_{k1}, l', z_{k1})$, (k=1, 2, 3 . . . ), and the coordinate points meet equation (33):

$$a_3 x_k^2 + b_3 x_k z_k + c_3 z_k^2 + d_3 x_k + e_3 z_k + f_3 = 0 (k=1,2,3\ldots) \tag{33}$$

$a_3$, $b_3$, $c_3$, $d_3$, $e_3$ and $f_3$ can be obtained by solving the equation, and the coordinate points are obtained by solving equations (34) and (35):

$$x_{U_{C'}} = \frac{b_3 \times e_3 - 2 \times c_3 \times d_3}{4 \times a_3 \times c_3 - b_3^2} \tag{34}$$

$$z_{U_{C'}} = \frac{b_3 \times d_3 - 2 \times a_3 \times e_3}{4 \times a_3 \times c_3 - b_3^2} \tag{35}$$

the detection is performed repeatedly for several times at different positions to obtain central coordinates $O'_{U_{Ai}}(x'_{U_{Ai}}, 0, z'_{U_{Ai}})$ and $O'_{W_{Bi}}(x'_{W_{Bi}}, l'''_{AB}, z'_{W_{Bi}})$ (i=1, 2, 3 . . . ) of the reference shaft section, and a central coordinate point set of the cross section of the measurement section is denoted as $C'_i(x_{C'i}, l', z_{C'i})$ (i=1, 2, 3 . . . ); a distance $d'_i$ from the central coordinate points of the cross section of the detection shaft section to the central axis of the reference section is obtained by a calculation equation:

$$d'_i = \left\| C'_i - \frac{(O'_{W_{Bi}} - O'_{U_{Ai}})(O'_{W_{Bi}} - O'_{U_{Ai}})^T}{(O'_{W_{Bi}} - O'_{U_{Ai}})^T(O'_{W_{Bi}} - O'_{U_{Ai}})}(C'_i - O'_{U_{Ai}}) \right\| (i = 1, 2, 3 \ldots) \tag{36}$$

coaxiality φt of the detection shaft section of the shaft workpiece is obtained by a difference value between a maximum value $d'_{max}$ and a minimum value $d'_{min}$ in the distance $d'_i$ from the obtained central coordinate points of the cross section of the detection shaft section to the central axis of the reference section, and a calculation equation is:

$$φt = d'_{max} - d'_{min} \tag{37}$$

By adopting the method disclosed herein, the central coordinate point set of the cross section of the detection shaft section of the workpiece can be obtained statically in a non-contact manner, and then error values of the axis of the detection shaft section and the reference axis are further obtained. Therefore, the influence caused by the rotation eccentricity of the workpiece clamping device and the complex working procedures of moving the workpiece can be avoided.

Provided is an in-place non-contact detection method for a shaft workpiece which is a camshaft, comprising:

(1) establishing a detection system, calibrating the detection system and establishing a detection coordinate system;

as shown in FIG. 3 and FIG. 4, the detection system comprises a grating guide rail 8 positioned on one side of the machine tool, and a measurement position A, a measurement position C and a measurement position B positioned on the grating guide rail at intervals in sequence, wherein the measurement position A is measured by the linear laser measuring instrument 6, the measurement position C is measured by the laser displacement sensor 7, the measurement position B is measured by the linear laser measuring instrument 6, and the linear laser measuring instrument 6 and the laser displacement sensor 7 are mounted on slide blocks of the grating guide rail 8; the measurement position A and the measurement position B are reference positions required to be detected, and the measurement position C is a position required to be subjected to detection of runout, coaxiality and profile degree; as shown in FIG. 4, the flatness of the linear laser measuring instrument, the laser displacement sensor and the grating straight guide rail is adjusted to reach 0.001 mm, the measuring directions of the linear laser measuring instrument and the laser displacement sensor are consistent, a calibration plate is placed at a distance L in front of the measuring directions, and a calibration plane of the calibration plate is adjusted to be orthogonal to a light path of the linear laser measuring instrument and to be perpendicular to a light path of the laser displacement sensor; wherein an XOY plane of the linear laser measuring instrument is parallel to the calibration plane of the calibration plate, the light path of the laser displacement sensor is perpendicular to the XOY plane, and the mounting direction of the laser displacement sensor on the grating guide rail is parallel to the Y axis; a coordinate system $O_A$—$X_A Y_A Z_A$ and a coordinate system $O_B$—$X_B Y_B Z_B$ of the linear laser measuring instrument at the position A and the position B are established; then the coordinate systems are adjusted to enable light spots of the laser displacement sensor to be on the Y axis of the light path of the linear laser measuring instrument, and a coordinate system $O_C$—$X_C Y_C Z_C$ of the laser displacement sensor at the position C is established; if measurement origins of the linear laser measuring instrument are denoted as zero, then the coordinates X and Z of $O_A$ and $O_B$ are 0; if a measurement origin of the laser displacement sensor is denoted as zero, then the coordinates X and Z of $O_C$ are 0;

the linear laser measuring instrument can obtain coordinate data in an XOZ plane, and coordinate data of the Y axis are obtained from the position of the light path of the linear laser measuring instrument on the grating guide rail; the coordinate origin $O_A$ of the linear laser measuring instrument at the position A is set as a world coordinate system origin, and if the coordinates of $O_A$ are calibrated as (0,0,0), and data measured by the linear laser measuring instrument at the position A are $(x_A, z_A)$, then three-dimensional coordinates at the position A are $(x_A, 0, z_A)$;

if a light path distance between the position A and the position B of the linear laser measuring instrument is $l_{AB}$, then coordinates of $O_B$ are calibrated as $(0,0, l_{AB})$; if data measured by the linear laser measuring instrument at the position B are $(x_B, z_B)$, then coordinates of the coordinate system $O_B$—$X_B Y_B Z_B$ in the coordinate system $O_A$—$X_A Y_A Z_A$ can be expressed as:

$$(x_B, y_B, z_B, 1) = (x_B, 0, z_B, 1)\begin{bmatrix} 1 & 0 & 0 & 0 \\ 0 & 1 & 0 & 0 \\ 0 & 0 & 1 & 0 \\ 0 & l_{AB} & 0 & 1 \end{bmatrix} \quad (1)$$

if a light path distance between the position A of the linear laser measuring instrument and the position C of the laser displacement sensor is $l_{AC}$, then coordinates of $O_C$ are calibrated as $(0,0, l_{AC})$; if data measured by the laser displacement sensor at the position C are $(z_C)$, then coordinates of the coordinate system $O_C$—$X_C Y_C Z_C$ in the coordinate system $O_A$—$X_A Y_A Z_A$ can be expressed as:

$$(x_C, y_C, z_C, 1) = (0, 0, z_C, 1)\begin{bmatrix} 1 & 0 & 0 & 0 \\ 0 & 1 & 0 & 0 \\ 0 & 0 & 1 & 0 \\ 0 & l_{AC} & 0 & 1 \end{bmatrix} \quad (2)$$

coordinate data of the workpiece in the coordinate system $O_A$—$X_A Y_A Z_A$ can be acquired by using the laser sensor of the detection system and then calculated and analyzed;

(2) analyzing a pose of the workpiece in the detection system to establish a coordinate system of a workpiece clamping device;

as shown in FIG. 5, the workpiece clamping device comprises a clamping bed control box 1, a clamping bed chuck 2, a camshaft 3 to be detected, a thimble 4 and a thimble slide rail 5, and when a normal axis of a detection section of the camshaft is not collinear with the ideal reference axis, namely when a rotation angle θ around the X-axis direction and a rotation angle α around the Z-axis direction exist in the camshaft and the detection system, a measurement section measured by the light path of the linear laser measuring instrument is an ellipse, wherein the minor axis of the ellipse is an axis diameter, an included angle exists between the major axis ac of the ellipse and the Z axis, and an included angle exists between the minor axis bd of the ellipse and the X axis; the ellipse center of the obtained ellipse profile is on the central axis, and an included angle between the measurement section and a cross section is λ, wherein if a length of the major axis ac of the ellipse is $l_{ac}$, and a length of the minor axis bd is $l_{bd}$, then a calculation equation of λ is:

$$\lambda = \arccos\frac{l_{bd}}{l_{ac}} \quad (3)$$

if a shaft gauge block is clamped in the workpiece clamping device, the linear laser measuring instrument is started to detect a section profile of the gauge block, and the gauge block is arranged in a measurement light path of the linear laser measuring instrument, then a cross section of the gauge block and the measurement light path is an elliptical profile; if a half-section profile arc ef of the gauge block at any position can be measured by the laser measuring instrument at the position A, then coordinates of profile points on the arc ef can be assumed as $Pn(x_n, 0, z_n)$, (n=1, 2, 3 . . . ), and the coordinate points meet equation (4):

$$ax_n^2 + bx_n z_n + cz_n^2 + dx_n + ez_n + f = 0 (n=1,2,3 \ldots) \quad (4)$$

in the equation, a, b, c, d, e and f are constant coefficients and are obtained by substituting into a coordinate point set;

a rotation angle φ of the major axis of the ellipse in the coordinate system $O_A$—$X_A Y_A Z_A$ is obtained by equation (5):

$$\phi = \frac{1}{2}\arctan\frac{b}{a-c} \quad (5)$$

if coordinates of a geometric center $O_U$ of the ellipse are assumed as $(x_U, z_U)$, then the coordinate points are obtained by equations (6) and (7):

$$x_U = \frac{b \times e - 2 \times c \times d}{4 \times a \times c - b^2} \quad (6)$$

$$z_U = \frac{b \times d - 2 \times a \times e}{4 \times a \times c - b^2} \quad (7)$$

the length $l_{ac}$ of the major axis and the length $l_{bd}$ of the minor axis can be obtained by equations (8) and (9), respectively:

$$l_{ac} = 2\sqrt{\frac{-2f}{(a+c) - \sqrt{b^2 + \left(\frac{a-c}{f}\right)^2}}} \quad (8)$$

$$l_{bd} = 2\sqrt{\frac{-2f}{(a+c) + \sqrt{b^2 + \left(\frac{a-c}{f}\right)^2}}} \quad (9)$$

the included angle $\lambda$ between the measurement section of the gauge block and the concentric cross section thereof is obtained by equations (3), (4), (8) and (9);

the minor axis of the measurement section A profile of the gauge block is the diameter of the concentric cross section A profile thereof, $\vec{bd}$ is denoted as an $X_S$ axis of the coordinate system of the workpiece clamping device, the center $O_U$ of the measurement section A profile is denoted as an origin $O_S$ of the coordinate system of the workpiece clamping device, a central axis of the cross section A profile perpendicular to the gauge block is denoted as a $Y_S$ axis, and the coordinate system $O_S$—$X_S Y_S Z_S$ of the workpiece clamping device conforming to the right-hand rule is established;

a deviation amount between the coordinate system $O_A$—$X_A Y_A Z_A$ of the detection system and the coordinate system $O_S$—$X_S Y_S Z_S$ of the workpiece clamping device is $(x_U, 0, z_U, \phi, \lambda, 0)$, namely points (x,y,z) of the coordinate system of the detection system are translated by $x_u$, and $z_u$ in the X-axis and Z-axis directions, respectively, then rotate around the X axis by the angle $\lambda$, and then rotate around the Y axis by the angle $\phi$, so that corresponding point coordinates (x',y', z') of the coordinate system $O_S$—$X_S Y_S Z_S$ of the workpiece clamping device may be obtained; therefore, a transformation relation between the coordinate system of the detection system and the coordinate system of the workpiece clamping device is:

$$\begin{pmatrix} x' \\ y' \\ z' \\ 1 \end{pmatrix} = \begin{bmatrix} \cos\lambda & 0 & \sin\lambda & 0 \\ 0 & 1 & 0 & 0 \\ -\sin\lambda & 0 & \cos\lambda & 0 \\ 0 & 0 & 0 & 1 \end{bmatrix} \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} x - x_U \\ y - 0 \\ z - z_U \\ 1 \end{bmatrix} \quad (10)$$

(3) controlling the workpiece clamping device of a camshaft processing machine tool to rotate, continuously acquiring data by a linear laser measuring instrument, and calculating and analyzing the acquired data to obtain an ideal reference axis of the camshaft;

the camshaft is clamped in the calibrated workpiece clamping device, the light path of the linear laser measuring instrument is aligned to a reference shaft section of the camshaft, and the linear laser measuring instrument is started for measurement at the position A and the position B; the linear laser measuring instrument is assumed at the position A, then coordinates of the obtained points of the section profile in the coordinate system $O_A$—$X_A Y_A Z_A$ are $P_i(x_i, 0, z_i)$, (i=1, 2, 3 . . . ), and the coordinate points meet equation (11):

$$a_1 x_n^2 + b_1 x_n z_n + c_1 z_n^2 + d_1 x_n + e_1 z_n + f_1 = 0 (n=1,2,3 \ldots) \quad (11)$$

the constants $a_1$, $b_1$, $c_1$, $d_1$, $e_1$ and $f_1$ can be obtained by solving the equation, and then the coordinate points are obtained by solving equations (12) and (13):

$$x_{U_A} = \frac{b_1 \times e_1 - 2 \times c_1 \times d_1}{4 \times a_1 \times c_1 - b_1^2} \quad (12)$$

$$z_{U_A} = \frac{b_1 \times d_1 - 2 \times a_1 \times e_1}{4 \times a_1 \times c_1 - b_1^2} \quad (13)$$

coordinates of the points of the section profile obtained by the linear laser measuring instrument at the measurement position B at a distance $l'_{AB}$ from the measurement position A in the coordinate system $O_A$—$X_A Y_A Z_A$ are $P_j(x_j, l'_{AB}, z_j)$, (j=1, 2, 3 . . . ); the coordinate points meet equation (14):

$$a_2 x_n^2 + b_2 x_n z_n + c_2 z_n^2 + d_2 x_n + e_2 z_n + f_2 = 0 (n=1,2,3 \ldots) \quad (14)$$

$a_2$, $b_2$, $c_2$, $d_2$, $e_2$ and $f_2$ can be obtained by solving the equation, and then the coordinate points are obtained by solving equations (15) and (16):

$$x_{W_B} = \frac{b_2 \times e_2 - 2 \times c_2 \times d_2}{4 \times a_2 \times c_2 - b_2^2} \quad (15)$$

$$z_{W_B} = \frac{b_2 \times d_2 - 2 \times a_2 \times e_2}{4 \times a_2 \times c_2 - b_2^2} \quad (16)$$

central coordinates $O_{U_A}(x_{U_A}, 0, z_{U_A})$ and $O_{W_B}(x_{W_B}, l'_{AB}, z_{W_B})$ of the cross section of the workpiece corresponding to the section profiles at the measurement position A and the measurement position B can be obtained, respectively; then a straight line equation of the central axis of the reference shaft section in the coordinate system $O_A$—$X_A Y_A Z_A$ is:

$$\frac{x - x_{U_A}}{x_{W_B} - x_{U_A}} = \frac{y - 0}{l'_{AB} - 0} = \frac{z - z_{U_A}}{z_{W_B} - z_{U_A}} \quad (17)$$

(4) continuously acquiring data of a detection part by a laser displacement sensor, and calculating and analyzing the acquired data to obtain actual machining precision of runout of a shaft neck of a camshaft; and coordinates of a real-time measurement point at the measurement position C are acquired by the laser displacement sensor by rotating the camshaft, and coordinates at a certain moment are assumed as $C_1(0, y_{C1}, z_{C1})$; the linear laser measuring instrument acquires real-time profile point data at the moment at the rotation position, coordinates of the points of the section profile obtained by the linear laser measuring instrument at the position A in the coordinate system $O_A$—$X_A Y_A Z_A$ are assumed as $P_{i1}(x_{i1}, 0, z_{i1})$, (i=1, 2, 3 . . . ), and the coordinate points meet equation (18):

$$a_{11} x_n^2 + b_{11} x_n z_n + c_{11} z_n^2 + d_{11} x_n + e_{11} z_n + f_{11} = 0 (n=1,2,3 \ldots) \quad (18)$$

$a_{11}$, $b_{11}$, $c_{11}$, $d_{11}$, $e_{11}$ and $f_{11}$ can be obtained by solving the equation, and the coordinate points are obtained by solving equations (19) and (20):

$$x_{U_{A1}} = \frac{b_{11} \times e_{11} - 2 \times c_{11} \times d_{11}}{4 \times a_{11} \times c_{11} - b_{11}^2} \quad (19)$$

$$z_{U_{A1}} = \frac{b_{11} \times d_{11} - 2 \times a_{11} \times e_{11}}{4 \times a_{11} \times c_{11} - b_{11}^2} \quad (20)$$

coordinates of the points of the section profile obtained by the linear laser measuring instrument at the moment at the measurement position B at a distance $l_{AB}''$ from the measurement position A in the coordinate system $O_A$—$X_A Y_A Z_A$ are assumed as $P_{j1}(x_{j1}, l_{AB}'', z_{j1})$, (j=1, 2, 3 . . . ), and the coordinate points meet equation (21):

$$a_{21}x_n^2 + b_{21}x_n z_n + c_{21}z_n^2 + d_{21}x_n + e_{21}z_n + f_{21} = 0 (n=1,2, 3 \ldots) \quad (21)$$

$a_{21}$, $b_{21}$, $c_{21}$, $d_{21}$, $e_{21}$ and $f_{21}$ can be obtained by solving the equation, and the coordinate points are obtained by solving equations (22) and (23):

$$x_{W_{B1}} = \frac{b_{21} \times e_{21} - 2 \times c_{21} \times d_{21}}{4 \times a_{21} \times c_{21} - b_{21}^2} \quad (22)$$

$$z_{W_{B1}} = \frac{b_{21} \times d_{21} - 2 \times a_{21} \times e_{21}}{4 \times a_{21} \times c_{21} - b_{21}^2} \quad (23)$$

central coordinates $O_{U_{A1}}(x_{U_{A1}}, 0, z_{U_{A1}})$ and $O_{W_{B1}}(x_{W_{B1}}, l_{AB}'', z_{W_{B1}})$ of the reference shaft section at the moment can be obtained; a distance $d_1$ from the measurement point at the moment to the real-time central axis is obtained by solving a calculation equation:

$$d_1 = \left\| C_1 - \frac{(o_{W_{B1}} - o_{U_{A1}})(o_{W_{B1}} - o_{U_{A1}})^T}{(o_{W_{B1}} - o_{U_{A1}})^T (o_{W_{B1}} - o_{U_{A1}})} (C_1 - O_{U_{A1}}) \right\| \quad (24)$$

data recorded at each moment are measured by rotating the camshaft for one circle, and a distance $d_i$ (i=1, 2, 3 . . . ) from measurement points at all the moments to the real-time central axis is calculated and obtained;
a radial circle runout t of the camshaft is obtained by a difference value between a maximum value $d_{max}$ and a minimum value $d_{min}$ in the distance $d_i$ (i=1, 2, 3 . . . ) from the real-time measurement points to the real-time central axis, and a calculation equation is:

$$t = d_{max} - d_{min} \quad (25)$$

the central axis detected in real time is used, so that the influence caused by the rotation eccentricity of the workpiece clamping device can be avoided, and the calculation precision is improved;
(5) continuously acquiring data of the detection part by adopting the linear laser measuring instrument, and calculating and analyzing the acquired data to obtain machining precision of coaxiality of the camshaft;
firstly, the measurement position A and the measurement position B of the reference shaft section of the shaft workpiece are subjected to profile detection by using the linear laser measuring instrument, real-time profile point data at a certain rotation position are obtained by the linear laser measuring instrument, coordinates of the points of the section profile obtained by the linear laser measuring instrument at the position A at the moment in the coordinate system $O_A$—$X_A Y_A Z_A$ are assumed as $P'_{i1}(x'_{i1}, 0, z'_{i1})$, (i=1, 2, 3 . . . ), and the coordinate points meet equation (26):

$$a'_{11}x'_{i1}{}^2 + b'_{11}x'_{i1}z_{i1} + c'_{11}z'_{i1}{}^2 + d'_{11}x'_{i1} + e'_{11}z'_{i1} + f'_{11} = 0 \\ (i=1,2,3 \ldots) \quad (26)$$

$a'_{11}$, $b'_{11}$, $c'_{11}$, $d'_{11}$, $e'_{11}$ and $f'_{11}$ can be obtained by solving the equation, and the coordinate points are obtained by solving equations (27) and (28):

$$x'_{U_{A1}} = \frac{b'_{11} \times e'_{11} - 2 \times c'_{11} \times d'_{11}}{4 \times a'_{11} \times c'_{11} - b'_{11}^2} \quad (27)$$

$$z'_{U_{A1}} = \frac{b'_{11} \times d'_{11} - 2 \times a'_{11} \times e'_{11}}{4 \times a'_{11} \times c'_{11} - b'_{11}^2} \quad (28)$$

coordinates of the points of the section profile obtained by the linear laser measuring instrument at the moment at the position B at a distance $l'''_{AB}$ from the position A in the coordinate system $O_A$—$X_A Y_A Z_A$ are assumed as $P'_{j1}(x'_{j1}, l'''_{AB}, z'_{j1})$, (j=1, 2, 3 . . . ), and the coordinate points meet equation (29):

$$a'_{21}x'_{i1}{}^2 + b'_{21}x'_{i1}z_{i1} + c'_{21}z'_{i1}{}^2 + d'_{21}x'_{i1} + e'_{21}z'_{i1} + f'_{21} = 0 \\ (i=1,2,3 \ldots) \quad (29)$$

$a'_{21}$, $b'_{21}$, $c'_{21}$, $d'_{21}$, $e'_{21}$ and $f'_{21}$ can be obtained by solving the equation, and the coordinate points are obtained by solving equations (30) and (31):

$$x'_{W_{B1}} = \frac{b'_{11} \times e'_{11} - 2 \times c'_{11} \times d'_{11}}{4 \times a'_{11} \times c'_{11} - b'_{11}^2} \quad (30)$$

$$z'_{W_{B1}} = \frac{b'_{11} \times d'_{11} - 2 \times a'_{11} \times e'_{11}}{4 \times a'_{11} \times c'_{11} - b'_{11}^2} \quad (31)$$

central coordinates $O'_{U_{A1}}(x'_{U_{A1}}, 0, z'_{U_{A1}})$ and $O'_{W_{B1}}(x'_{W_{B1}}, l'''_{AB}, z'_{W_{B1}})$ of the reference shaft section at the moment can be obtained, and a straight line equation of the central axis of the reference shaft section at the moment in the coordinate system $O_A$—$X_A Y_A Z_A$ is:

$$\frac{x - x'_{U_{A1}}}{x'_{W_{B1}} - x'_{U_{A1}}} = \frac{y - 0}{l''_{AB} - 0} = \frac{z - z'_{U_{A1}}}{z'_{W_{B1}} - z'_{U_{A1}}} \quad (32)$$

the linear laser measuring instrument is moved to a position C' of the workpiece detection shaft section along the $Y_A$-axis direction, a moving distance l' is obtained by the grating guide rail, coordinates of the points of the section profile obtained by the linear laser measuring instrument at the moment at the position C' in the coordinate system $O_A$—$X_A Y_A Z_A$ are assumed as $P_{k1}(x_{k1}, l', z_{k1})$, (k=1, 2, 3 . . . ), and the coordinate points meet equation (33):

$$a_3 x_k^2 + b_3 x_k z_k + c_3 z_k^2 + d_3 x_k + e_3 z_k + f_3 = 0 (k=1,2,3 \ldots) \quad (33)$$

$a_3$, $b_3$, $c_3$, $d_3$, $e_3$ and $f_3$ can be obtained by solving the equation, and the coordinate points are obtained by solving equations (34) and (35):

$$x_{U_{C'}} = \frac{b_3 \times e_3 - 2 \times c_3 \times d_3}{4 \times a_3 \times c_3 - b_3^2} \quad (34)$$

-continued $$z_{U_{C'}} = \frac{b_3 \times d_3 - 2 \times a_3 \times e_3}{4 \times a_3 \times c_3 - b_3^2} \quad (35)$$

the detection is performed repeatedly for several times at different positions to obtain central coordinates $O'_{U_{Ai}}$ $(x'_{U_{Ai}}, 0, z'_{U_{Ai}})$ and $O'_{W_{Bi}}(x'_{W_{Bi}}, l'''_{AB}, z'_{W_{Bi}})$ (i=1, 2, 3 . . . ) of the VII reference shaft section, and a central coordinate point set of the cross section of the measurement section is denoted as $C'_i(x_{C'i}, l', z_{C'i})$ (i=1, 2, 3 . . . ); a distance $d'_i$ from the central coordinate points of the cross section of the detection shaft section to the central axis of the reference section is obtained by a calculation equation:

$$d'_i = \left\| C'_i - \frac{(o'_{W_{Bi}} - o'_{U_{Ai}})(o'_{W_{Bi}} - o'_{U_{Ai}})^T}{(o'_{W_{Bi}} - o'_{U_{Ai}})^T (o'_{W_{Bi}} - o'_{U_{Ai}})} (C'_i - O'_{U_{Ai}}) \right\| (i = 1, 2, 3 \ldots) \quad (36)$$

coaxiality φt of the detection shaft section of the camshaft is obtained by a difference value between a maximum value $d'_{max}$ and a minimum value $d'_{min}$ in the distance $d'_i$ from the obtained central coordinate points of the cross section of the detection shaft section to the central axis of the reference section, and a calculation equation is:

$$\varphi t = d'_{max} - d'_{min} \quad (37)$$

by adopting the method disclosed herein, the central coordinate point set of the cross section of the detection shaft section of the workpiece can be obtained statically in a non-contact manner, and then error magnitudes of the axis of the detection shaft section and the reference axis are further obtained. Therefore, the influence caused by the rotation eccentricity of the workpiece clamping device and the complex working procedures of moving the workpiece can be avoided;

(6) continuously acquiring data of a convex peach of a camshaft cam by the linear laser measuring instrument, and calculating and analyzing the acquired data to obtain machining precision of profile degree of the camshaft cam;

the linear laser measuring instrument is moved to the convex peach of the cam, data acquisition is performed once when the linear laser measuring instrument moves for a short distance, data coordinates of the coordinate system $O_A$—$X_A Y_A Z_A$ obtained by acquisition are converted into coordinates of the coordinate system $O_S$—$X_S Y_S Z_S$ of the workpiece clamping device through an algorithm, and profile points are fit and compared with a standard cam profile to calculate the profile degree.

Example

Taking a camshaft produced by a diesel engine plant as an example, the diameter of a shaft neck of the camshaft is 180 mm, the length is 1780 mm, the requirement on runout tolerance is 0.05 mm, the requirement on coaxiality tolerance is 0.05 mm, and the requirement on profile degree of a convex peach is 0.08 mm. According to the size of the detected camshaft, a linear laser measuring instrument of the detection device selects an LJ-X8400 model with the maximum measurable width of 320 mm and the precision of 5 μm; a CCD laser displacement sensor selects an LK-G400 model with the precision of 2 μm and the measurable range of 400±100 mm.

The detection system is placed on one side of a machine tool, the camshaft is placed in the workpiece clamping device well calibrated with the detection system, a light path of the linear laser measuring instrument is aligned to a reference shaft section of a workpiece, and the linear laser measuring instrument is started at a position A and a position B for measurement; if coordinates of the points of a section profile obtained by the linear laser measuring instrument at the position A in a coordinate system $O_A$—$X_A Y_A Z_A$ are assumed as $P_i(x_i, 0, z_i)$, (i=1, 2, 3 . . . ), then coordinates of the points of a section profile obtained by the linear laser measuring instrument at the position B at a distance $l_{AB}$ from the position A in the coordinate system $O_A$—$X_A Y_A Z_A$ are $P_j(x_j, l_{AB}, z_j)$, (i=1, 2, 3 . . . ). Central coordinates $O_U$ ($x_U$, 0, $z_U$) and $O_W$ ($x_W$, $l_{AB}$, $z_W$) of cross sections of the workpiece corresponding to the section profiles at the position A and the position B can be obtained by calculation, and the results are shown as coordinates $O_U$ and $O_W$ in Table 1.

Coordinates $C_i(0, y_{Ci}, z_{Ci})$ (i=1, 2, 3 . . . ) of real-time measurement points are acquired by the laser displacement sensor by rotating the workpiece, real-time profile point data at the same rotation position are acquired by the linear laser measuring instrument, and central coordinates $O_{Ui}(x_{Ui}, 0, z_{Ui})$ and $O_{Wi}(x_{Wi}, l_{AB}, z_{Wi})$ (i=1, 2, 3 . . . ) of the reference shaft section are acquired by calculation. A distance $d_i$ from the real-time measurement points to the real-time central axis can be obtained by calculation, a radial circle runout t of the workpiece is obtained by calculation, and the result is shown as the t value in Table 1.

Then the linear laser measuring instrument is moved to a workpiece detection shaft section along the $Y_A$-axis direction, a moving distance l is obtained by the grating guide rail, coordinates of the profile of the workpiece detection shaft section in the coordinate system $O_A$—$X_A Y_A Z_A$ can be obtained by calculation, and central coordinates of the cross section of the detection shaft section can be obtained by calculation. The detection is performed repeatedly for several times at different positions to obtain a central coordinate point set of the cross section of the detection shaft section, which is denoted as $D_i(0, y_{Di}, z_{Di})$ (i=1, 2, 3 . . . ); then a distance $d_i$ from the central coordinate points of the cross section of the detection shaft section to the central axis of the reference section can be obtained by calculation, the coaxiality φt of the workpiece detection shaft section can be obtained by calculation, and the result is shown as the φt value in Table 1.

The linear laser measuring instrument is moved to the convex peach of the cam, data acquisition is performed once when the linear laser measuring instrument moves for a small distance, and data coordinates of the coordinate system $O_A$—$X_A Y_A Z_A$ are converted into coordinates of a coordinate system $O_S$—$X_S Y_S Z_S$ of the workpiece clamping device by a computer system through an algorithm. The profile points are fit by using a two-dimensional or three-dimensional software of the system, and then compared with the designed standard cam profile to calculate the profile degree, and the result is shown as the profile degree value in Table 1.

TABLE 1

Partial data of axis detection results

| Nos. | Coordinate $0_U$ | Coordinate $0_W$ | λ (°) | φ (°) | t (mm) | φt (mm) | Profile degree ... (mm) |
|---|---|---|---|---|---|---|---|
| 1 | (22.992, 0.000, 510.193) | (64.947, 1600.022, 426.341) | 2.847 | 33.720 | 0.038 | 0.029 | 0.056 |
| 2 | (23.254, 10.012, 509.669) | (65.209, 1610.038, 425.817) | 2.853 | 33.731 | 0.042 | 0.041 | 0.063 |
| 3 | (23.778, 30.029, 508.621) | (65.733, 1630.045, 424.768) | 2.848 | 33.728 | 0.039 | 0.036 | 0.058 |
| 4 | (24.303, 50.033, 507.573) | (66.258, 1650.021, 423.721) | 2.843 | 33.723 | 0.037 | 0.032 | 0.052 |
| 5 | (24.565, 60.021, 507.049) | (66.520, 1660.045, 423.196) | 2.846 | 33.712 | 0.035 | 0.025 | 0.061 |
| 6 | (24.827, 70.013, 506.525) | (66.782, 1670.027, 422.672) | 2.850 | 33.721 | 0.040 | 0.031 | 0.065 |
| 7 | (25.089, 80.047, 506.001) | (67.044, 1680.034, 422.148) | 2.845 | 33.715 | 0.038 | 0.026 | 0.059 |
| ... | | | | | | | |
| Extreme difference | — | — | 0.001 | 0.019 | 0.007 | 0.016 | 0.013 |
| Mean value | — | — | 2.847 | 33.721 | 0.0384 | 0.031 | 0.059 |

What is claimed is:

1. An in-place non-contact detection method for a shaft workpiece, comprising:

(1) establishing a detection system, calibrating the detection system and establishing a detection coordinate system;

(2) analyzing a pose of a workpiece in the detection system to establish a coordinate system of a workpiece clamping device;

(3) controlling the workpiece clamping device of a shaft workpiece processing machine tool to rotate, continuously acquiring data by a linear laser measuring instrument, and calculating and analyzing acquired data to obtain an ideal reference axis of the shaft workpiece;

(4) continuously acquiring data of a detection part by a laser displacement sensor, and calculating and analyzing the acquired data to obtain actual machining precision of runout of a shaft neck of a camshaft; and (5) continuously acquiring data of the detection part by adopting the linear laser measuring instrument, and calculating and analyzing the acquired data to obtain machining precision of coaxiality of the shaft workpiece, wherein specific operations of the step (1) comprises: the detection system comprising a grating guide rail positioned on one side of the machine tool, and a measurement position A, a measurement position C and a measurement position B positioned on the grating guide rail at intervals in sequence, wherein the measurement position A is measured by the linear laser measuring instrument, the measurement position C is measured by the laser displacement sensor, and the measurement position B is measured by the linear laser measuring instrument: the measurement position A and the measurement position B are reference positions required to be detected, and the measurement position C is a position required to be subjected to detection of runout, coaxiality and profile degree: measuring directions of the linear laser measuring instrument and the laser displacement sensor are consistent, a calibration plate is placed at a distance L in front of the measuring directions, and a calibration plane of the calibration plate is adjusted to be orthogonal to a light path of the linear laser measuring instrument and to be perpendicular to a light path of the laser displacement sensor; wherein an XOY plane of the linear laser measuring instrument is parallel to the calibration plane of the calibration plate, the light path of the laser displacement sensor is perpendicular to the XOY plane, and the mounting direction of the laser displacement sensor on the grating guide rail is parallel to the Y axis: a coordinate system $O_A$—$X_A Y_A Z_A$ and a coordinate system $O_B$—$X_B Y_B Z_B$ of the linear laser measuring instrument at the position A and the position B are established: then the coordinate systems are adjusted to enable light spots of the laser displacement sensor to be on the Y axis of the light path of the linear laser measuring instrument, and a coordinate system $O_C$—$X_C Y_C Z_C$ of the laser displacement sensor at the position C is established: if measurement origins of the linear laser measuring instrument are denoted as zero, then the coordinates X and Z of $O_A$ and $O_B$ are 0; if a measurement origin of the laser displacement sensor is denoted as zero, then the coordinates X and Z of $O_C$ are 0;

the linear laser measuring instrument can obtain coordinate data in an XOZ plane, and coordinate data of the Y axis are obtained from the position of the light path of the linear laser measuring instrument on the grating guide rail: the coordinate origin $O_A$ of the linear laser measuring instrument at the position A is set as a world coordinate system origin, and if the coordinates of $O_A$ are calibrated as (0,0,0), and data measured by the linear laser measuring instrument at the position A are $(x_A, z_A)$, then three-dimensional coordinates at the position A are $(x_A, 0, z_A)$;

if a light path distance between the position A and the position B of the linear laser measuring instrument is $l_{AB}$, then coordinates of $O_B$ are calibrated as $(0,0,l_{AB})$; if data measured by the linear laser measuring instrument at the position B are $(x_B, z_B)$, then coordinates of the coordinate system $O_B$—$X_B Y_B Z_B$ in the coordinate system $O_A$—$X_A Y_A Z_A$ can be expressed as:

$$(x_B, y_B, z_B, 1) = (x_B, 0, z_B, 1)\begin{bmatrix} 1 & 0 & 0 & 0 \\ 0 & 1 & 0 & 0 \\ 0 & 0 & 1 & 0 \\ 0 & l_{AB} & 0 & 1 \end{bmatrix} \quad (1)$$

if a light path distance between the position A of the linear laser measuring instrument and the position C of the laser displacement sensor is $l_{AC}$, then coordinates of $O_C$ are calibrated as $(0,0, l_{AC})$: if data measured by the laser displacement sensor at the position C are $(z_C)$, then coordinates of the coordinate system $O_C$—$X_C Y_C Z_C$ in the coordinate system $O_A$—$X_A Y_A Z_A$ can be expressed as:

$$(x_C, y_C, z_C, 1) = (0, 0, z_C, 1)\begin{bmatrix} 1 & 0 & 0 & 0 \\ 0 & 1 & 0 & 0 \\ 0 & 0 & 1 & 0 \\ 0 & l_{AC} & 0 & 1 \end{bmatrix}. \quad (2)$$

2. The in-place non-contact detection method for the shaft workpiece according to claim 1, wherein specific operations of the step (2) comprises: when a normal axis of a detection section of the shaft workpiece is not collinear with the ideal reference axis, namely when a rotation angle θ around an X-axis direction and a rotation angle α around a Z-axis direction exist in the shaft workpiece and the detection system, a measurement section measured by the light path of the linear laser measuring instrument is an ellipse, wherein a minor axis of the ellipse is an axis diameter, an included angle exists between a major axis ac of the ellipse and the Z axis, and an included angle exists between the minor axis bd of the ellipse and the X axis; an ellipse center of the obtained ellipse profile is on the central axis, and an included angle between the measurement section and a cross section is X, wherein if a length of the major axis ac of the ellipse is $l_{ac}$, and a length of the minor axis bd is $l_{bd}$, then a calculation equation of λ is:

$$\lambda = \arccos \frac{l_{bd}}{l_{ac}} \quad (3)$$

if a shaft gauge block is clamped in the workpiece clamping device, the linear laser measuring instrument is started to detect a section profile of the gauge block, and the gauge block is arranged in a measurement light path of the linear laser measuring instrument, then a cross section of the gauge block and the measurement light path is an elliptical profile; if a half-section profile arc $\hat{ef}$ of the gauge block at any position can be measured by the laser measuring instrument at the position A, then coordinates of profile points on the arc $\hat{ef}$ can be assumed as $Pn(x_n, 0, z_n)$, $(n=1, 2, 3 \ldots)$, and the coordinate points meet equation (4):

$$ax_n^2 + bx_n z_n + cz_n^2 + dx_n + ez_n + f = 0 (n = 1, 2, 3 \ldots) \quad (4)$$

in the equation, a, b, c, d, e and f are constant coefficients and are obtained by substituting into a coordinate point set;

a rotation angle φ of the major axis of the ellipse in the coordinate system $O_A$—$X_A Y_A Z_A$ is obtained by equation (5):

$$\phi = \frac{1}{2}\arctan\frac{b}{a-c} \quad (5)$$

if coordinates of a geometric center $O_U$ of the ellipse are assumed as $(x_U, z_U)$, then the coordinate points are obtained by equations (6) and (7):

$$x_U = \frac{b \times e - 2 \times c \times d}{4 \times a \times c - b^2} \quad (6)$$

$$z_U = \frac{b \times d - 2 \times a \times e}{4 \times a \times c - b^2} \quad (7)$$

the length $l_{ac}$ of the major axis and the length $l_{bd}$ of the minor axis can be obtained by equations (8) and (9), respectively:

$$l_{ac} = 2\sqrt{\frac{-2f}{(a+c) - \sqrt{b^2 + \left(\frac{a-c}{f}\right)^2}}} \quad (8)$$

$$l_{bd} = 2\sqrt{\frac{-2f}{(a+c) + \sqrt{b^2 + \left(\frac{a-c}{f}\right)^2}}} \quad (9)$$

the included angle λ between the measurement section of the gauge block and the concentric cross section thereof is obtained by equations (3), (4), (8) and (9);
the minor axis of the measurement section A profile of the gauge block is a diameter of the concentric cross section A profile thereof, $\vec{bd}$ is denoted as an $X_S$ axis of the coordinate system of the workpiece clamping device, a center $O_U$ of the measurement section A profile is denoted as an origin $O_S$ of the coordinate system of the workpiece clamping device, a central axis of the cross section A profile perpendicular to the gauge block is denoted as a $Y_S$ axis, and a coordinate system $O_S$—$X_S Y_S Z_S$ of the workpiece clamping device conforming to the right-hand rule is established;
a deviation amount between the coordinate system $O_A$—$X_A Y_A Z_A$ of the detection system and the coordinate system $O_S$—$X_S Y_S Z_S$ of the workpiece clamping device is $(x_U, 0, z_U, \phi, \lambda, 0)$, namely points (x, y, z) of the coordinate system of the detection system are translated by $x_u$ and $z_u$ in the X-axis and Z-axis directions, respectively, then rotate around the X axis by the angle λ, and then rotate around the Y axis by the angle φ, so that corresponding point coordinates (x', y', z') of the coordinate system $O_S$—$X_S Y_S Z_S$ of the workpiece clamping device may be obtained; therefore, a transformation relation between the coordinate system of the detection system and the coordinate system of the workpiece clamping device is:

$$\begin{pmatrix} x' \\ y' \\ z' \\ 1 \end{pmatrix} = \begin{bmatrix} \cos\lambda & 0 & \sin\lambda & 0 \\ 0 & 1 & 0 & 0 \\ -\sin\lambda & 0 & \cos\lambda & 0 \\ 0 & 0 & 0 & 1 \end{bmatrix} \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} x - x_U \\ y - 0 \\ z - z_U \\ 1 \end{bmatrix}. \quad (10)$$

3. The in-place non-contact detection method for the shaft workpiece according to claim 2, wherein specific operations of the step (3) comprises: the shaft workpiece is clamped in the calibrated workpiece clamping device, the light path of the linear laser measuring instrument is aligned to a reference shaft section of the shaft workpiece, and the linear laser measuring instrument is started for measurement at the position A and the position B; the linear laser measuring instrument is assumed at the position A; coordinates of the obtained points of the section profile in the coordinate system $O_A$—$X_A Y_A Z_A$ are $P_i(x_i, 0, z_i)$, (i=1, 2, 3 . . . ), and the coordinate points meet equation (11):

$$a_1 x_n^2 + b_1 x_n z_n + c_1 z_n^2 + d_1 x_n + e_1 z_n + f_1 = 0 (n=1,2,3 \ldots) \quad (11)$$

the constants $a_1$, $b_1$, $c_1$, $d_1$, $e_1$ and $f_1$ can be obtained by solving the equation, and then the coordinate points are obtained by solving equations (12) and (13):

$$x_{U_A} = \frac{b_1 \times e_1 - 2 \times c_1 \times d_1}{4 \times a_1 \times c_1 - b_1^2} \quad (12)$$

$$z_{U_A} = \frac{b_1 \times d_1 - 2 \times a_1 \times e_1}{4 \times a_1 \times c_1 - b_1^2} \quad (13)$$

coordinates of the points of the section profile obtained by the linear laser measuring instrument at the measurement position B at a distance $l'_{AB}$ from the measurement position A in the coordinate system $O_A$—$X_A Y_A Z_A$ are P$(x, l'_B, z_j)$, (j=1, 2, 3 . . . ); the coordinate points meet equation (14):

$$a_2 x_n^2 + b_2 x_n z_n + c_2 z_n^2 + d_2 x_n + e_2 z_n + f_2 = 0 (n=1,2,3 \ldots) \quad (14)$$

$a_2$, $b_2$, $c_2$, $d_2$, $e_2$ and $f_2$ can be obtained by solving the equation, and then the coordinate points are obtained by solving equations (15) and (16):

$$x_{W_B} = \frac{b_2 \times e_2 - 2 \times c_2 \times d_2}{4 \times a_2 \times c_2 - b_2^2} \quad (15)$$

$$z_{W_B} = \frac{b_2 \times d_2 - 2 \times a_2 \times e_2}{4 \times a_2 \times c_2 - b_2^2} \quad (16)$$

central coordinates $O_{UA}$ $(x_{UA}, 0, z_{UA})$ and $O_{W_B}(x_{W_B}, l'_{AB}, z_{W_B})$ of the cross section of the workpiece corresponding to the section profiles at the measurement position A and the measurement position B can be obtained, respectively; then a straight line equation of the central axis of the reference shaft section in the coordinate system $O_A$—$X_A Y_A Z_A$ is:

$$\frac{x - x_{U_A}}{x_{W_B} - x_{U_A}} = \frac{y - 0}{l'_{AB} - 0} = \frac{z - z_{U_A}}{z_{W_B} - z_{U_A}}. \quad (17)$$

4. The in-place non-contact detection method for the shaft workpiece according to claim 3, wherein specific operation of the step (4) comprises: coordinates of a real-time measurement point at the measurement position C are acquired by the laser displacement sensor by rotating the shaft workpiece, and coordinates at a certain moment are assumed as $C_1(0, y_{C1}, z_{C1})$; the linear laser measuring instrument acquires real-time profile point data at the moment at the rotation position, coordinates of the points of the section profile obtained by the linear laser measuring instrument at the position A in the coordinate system $O_A$—$X_A Y_A Z_A$ are assumed as $P_{i1}(x_{i1}, 0, z_{i1})$, (i=1, 2, 3 . . . ), and the coordinate points meet equation (18):

$$a_{11} x_n^2 + b_{11} x_n z_n + c_{11} z_n^2 + d_{11} x_n + e_{11} z_n + f_{11} = 0 (n=1,2, 3 \ldots) \quad (18)$$

$a_{11}$, $b_{11}$, $c_{11}$, $d_{11}$, $e_{11}$ and $f_{11}$ can be obtained by solving the equation, and the coordinate points are obtained by solving equations (19) and (20):

$$x_{U_{A1}} = \frac{b_{11} \times e_{11} - 2 \times c_{11} \times d_{11}}{4 \times a_{11} \times c_{11} - b_{11}^2} \quad (19)$$

$$z_{U_{A1}} = \frac{b_{11} \times d_{11} - 2 \times a_{11} \times e_{11}}{4 \times a_{11} \times c_{11} - b_{11}^2} \quad (20)$$

coordinates of the points of the section profile obtained by the linear laser measuring instrument at the moment at the measurement position B at a distance $l''_{AB}$ from the measurement position A in the coordinate system $O_A$—$X_A Y_A Z_A$ are assumed as $P_{j1}(x_{j1}, l''_{AB}, z_{j1})$ (j=1, 2, 3 . . . ), and the coordinate points meet equation (21):

$$a_{21} x_n^2 + b_{21} x_n z_n + c_{21} z_n^2 + d_{21} x_n + e_{21} z_n + f_{21} = 0 (n=1,2, 3 \ldots) \quad (21)$$

$a_{21}$, $b_{21}$, $c_{21}$, $d_{21}$, $e_{21}$ and $f_{21}$ can be obtained by solving the equation, and the coordinate points are obtained by solving equations (22) and (23):

$$x_{W_{B1}} = \frac{b_{21} \times e_{21} - 2 \times c_{21} \times d_{21}}{4 \times a_{21} \times c_{21} - b_{21}^2} \quad (22)$$

$$z_{W_{B1}} = \frac{b_{21} \times d_{21} - 2 \times a_{21} \times e_{21}}{4 \times a_{21} \times c_{21} - b_{21}^2} \quad (23)$$

central coordinates $O_{U_{A1}}$ $(x_{U_{A1}}, 0, z_{U_{A1}})$ and $O_{W_{B1}}(x_{W_{B1}}, l''_{AB}, z_{W_{B1}})$ of the reference shaft section at the moment can be obtained; a distance $d_1$ from the measurement point at the moment to the real-time central axis is obtained by solving a calculation equation:

$$d_1 = \left\| C_1 - \frac{(O_{W_{B1}} - O_{U_{A1}})(O_{W_{B1}} - O_{U_{A1}})^T}{(O_{W_{B1}} - O_{U_{A1}})^T (O_{W_{B1}} - O_{U_{A1}})} (C_1 - O_{U_{A1}}) \right\| \quad (24)$$

data recorded at each moment are measured by rotating the shaft workpiece for one circle, and a distance $d_i$ (i=1, 2, 3 . . . ) from measurement points at all the moments to the real-time central axis is calculated and obtained;

a radial circle runout t of the shaft workpiece is obtained by a difference value between a maximum value $d_{max}$ and a minimum value $d_{min}$ in the distance d (i=1, 2, 3 . . . ) from the real-time measurement points to the real-time central axis, and a calculation equation is:

$$t = d_{max} - d_{min} \quad (25).$$

5. The in-place non-contact detection method for the shaft workpiece according to claim 4, wherein specific operations of the step (5) comprises: firstly, the measurement position A and the measurement position B of the reference shaft section of the shaft workpiece are subjected to profile detection by using the linear laser measuring instrument, real-time profile point data at a certain rotation position are obtained by the linear laser measuring instrument, coordinates of the points of the section profile obtained by the linear laser measuring instrument at the position A at the moment in the coordinate system $O_A$—$X_AY_AZ_A$ are assumed as $P'_{i1}(x'_{i1}, 0, z'_{i1})$, (i=1, 2, 3 ...), and the coordinate points meet equation (26):

$$a'_{11}x'^2_{i1}+b'_{11}x'_{i1}z'_{i1}+c'_{11}z'^2_{i1}+d'_{11}x'_{i1}+e'_{11}z'_{i1}+f'_{11}=0 \quad (i=1,2,3\ldots) \tag{26}$$

$a'_{11}$, $b'_{11}$, $c'_{11}$, $d'_{11}$, $e'_{11}$ and $f'_{11}$ can be obtained by solving the equation, and the coordinate points are obtained by solving equations (27) and (28):

$$x'_{U_{A1}} = \frac{b'_{11} \times e'_{11} - 2 \times c'_{11} \times d'_{11}}{4 \times a'_{11} \times c'_{11} - b'^2_{11}} \tag{27}$$

$$z'_{U_{A1}} = \frac{b'_{11} \times d'_{11} - 2 \times a'_{11} \times e'_{11}}{4 \times a'_{11} \times c'_{11} - b'^2_{11}} \tag{28}$$

coordinates of the points of the section profile obtained by the linear laser measuring instrument at the moment at the position B at a distance $l'''_{AB}$ from the position A in the coordinate system $O_A$—$X_AY_AZ_A$ are assumed as $P'_{j1}(x'_{j1}, l'''_{AB}, z'_{j1})$, (j=1, 2, 3 ...), and the coordinate points meet equation (29):

$$a'_{21}x'^2_{i1}+b'_{21}x'_{i1}z'_{i1}+c'_{21}z'^2_{i1}+d'_{21}x'_{i1}+e'_{21}z'_{i1}+f'_{21}=0 \quad (i=1,2,3\ldots) \tag{29}$$

$a'_{21}$, $b'_{21}$, $c'_{21}$, $d'_{21}$, $e'_{21}$ and $f'_{21}$ can be obtained by solving the equation, and the coordinate points are obtained by solving equations (30) and (31)

$$x'_{W_{B1}} = \frac{b'_{21} \times e'_{21} - 2 \times c'_{21} \times d'_{21}}{4 \times a'_{21} \times c'_{21} - b'^2_{21}} \tag{30}$$

$$z'_{W_{B1}} = \frac{b'_{21} \times d'_{21} - 2 \times a'_{21} \times e'_{21}}{4 \times a'_{21} \times c'_{21} - b'^2_{21}} \tag{31}$$

central coordinates $O'_{U_{A1}}(x'_{U_{A1}}, 0, z'_{U_{A1}})$ and $O'_{W_{B1}}(x'_{W_{B1}}, l'''_{AB}, z'_{W_{B1}})$ of the reference shaft section at the moment can be obtained, and a straight line equation of the central axis of the reference shaft section at the moment in the coordinate system $O_A$—$X_AY_AZ_A$ is:

$$\frac{x - x'_{U_{A1}}}{x'_{W_{B1}} - x'_{U_{A1}}} = \frac{y - 0}{l'''_{AB} - 0} = \frac{z - z'_{U_{A1}}}{z'_{W_{B1}} - z'_{U_{A1}}} \tag{32}$$

the linear laser measuring instrument is moved to a position C' of the workpiece detection shaft section along the $Y_A$-axis direction, a moving distance l' is obtained by the grating guide rail, coordinates of the points of the section profile obtained by the linear laser measuring instrument at the moment at the position C' in the coordinate system $O_A$—$X_AY_AZ_A$ are assumed as $P_{k1}(x_{k1}, l'_{AB}, z_{k1})$, (k=1, 2, 3 ...), and the coordinate points meet equation (33):

$$a_3x_k^2+b_3x_kz_k+c_3z_k^2+d_3x_k+e_3z_k+f_3=0 (k=1,2,3\ldots) \tag{33}$$

$a_3$, $b_3$, $c_3$, $d_3$, $e_3$ and $f_3$ can be obtained by solving the equation, and the coordinate points are obtained by solving equations (34) and (35):

$$x_{U_{C'}} = \frac{b_3 \times e_3 - 2 \times c_3 \times d_3}{4 \times a_3 \times c_3 - b_3^2} \tag{34}$$

$$z_{U_{C'}} = \frac{b_3 \times d_3 - 2 \times a_3 \times e_3}{4 \times a_3 \times c_3 - b_3^2} \tag{35}$$

the detection is performed repeatedly for several times at different positions to obtain central coordinates $O'_{U_{Ai}}(x'_{U_{Ai}}, 0, z'_{U_{Ai}})$ and $O'_{W_{Bi}}(x'_{W_{Bi}}, l'''_{AB}, z'_{W_{Bi}})$(i=1, 2, 3 ...) of the reference shaft section, and a central coordinate point set of the cross section of the measurement section is denoted as $C'_i(x_{C'i}, l', z_{C'i})$ (i=1, 2, 3 ...); a distance d from the central coordinate points of the cross section of the detection shaft section to the central axis of the reference section is obtained by a calculation equation:

$$d'_i = \left\| C'_i - \frac{(O'_{W_{Bi}} - O'_{U_{Ai}})(O'_{W_{Bi}} - O'_{U_{Ai}})^T}{(O'_{W_{Bi}} - O'_{U_{Ai}})^T(O'_{W_{Bi}} - O'_{U_{Ai}})}(C'_i - O'_{U_{Ai}}) \right\| (i = 1, 2, 3 \ldots) \tag{36}$$

coaxiality φt of the detection shaft section of the shaft workpiece is obtained by a difference value between a maximum value $d'_{max}$ and a minimum value $d'_{min}$ in the distance d from the obtained central coordinate points of the cross section of the detection shaft section to the central axis of the reference section, and a calculation equation is:

$$φt=d'_{max}-d'_{min} \tag{37}$$

6. The in-place non-contact detection method for the shaft workpiece according to claim 5, wherein the shaft workpiece is a camshaft, the linear laser measuring instrument continuously acquires data of a convex peach of a camshaft cam, and the acquired data are calculated and analyzed to obtain machining precision of profile degree of the camshaft cam;

the linear laser measuring instrument is moved to the convex peach of the cam, data acquisition is performed once when the linear laser measuring instrument moves for a short distance, data coordinates of the coordinate system $O_A$—$X_AY_AZ_A$ obtained by acquisition are converted into coordinates of the coordinate system $O_S$—$X_SY_SZ_S$ of the workpiece clamping device through an algorithm, and profile points are fit and compared with a standard cam profile to calculate the profile degree.

* * * * *